(12) United States Patent
Matsuura

(10) Patent No.: US 12,513,428 B2
(45) Date of Patent: Dec. 30, 2025

(54) SOLID-STATE IMAGING DEVICE

(71) Applicants: Kabushiki Kaisha Toshiba, Tokyo (JP); Toshiba Electronic Devices & Storage Corporation, Tokyo (JP)

(72) Inventor: Masakazu Matsuura, Yokohama Kanagawa (JP)

(73) Assignees: Kabushiki Kaisha Toshiba, Kawasaki (JP); Toshiba Electronic Devices & Storage Corporation, Kawasaki (JP)

(*) Notice: Subject to any disclaimer, the term of this patent is extended or adjusted under 35 U.S.C. 154(b) by 167 days.

(21) Appl. No.: 18/425,226

(22) Filed: Jan. 29, 2024

(65) Prior Publication Data

US 2025/0097600 A1 Mar. 20, 2025

(30) Foreign Application Priority Data

Sep. 20, 2023 (JP) .................. 2023-153867

(51) Int. Cl.
  *H04N 25/77* (2023.01)
  *H04N 1/193* (2006.01)
  *H04N 25/778* (2023.01)
  *H04N 25/779* (2023.01)
  *H04N 25/78* (2023.01)
  *H04N 25/76* (2023.01)

(52) U.S. Cl.
  CPC ......... *H04N 25/77* (2023.01); *H04N 25/7795* (2023.01)

(58) Field of Classification Search
  CPC .. H04N 25/77; H04N 25/7795; H04N 25/778; H04N 25/779; H04N 25/78; H04N 1/19; H04N 1/193; H04N 1/1934; H04N 1/195; H04N 1/19584; H10F 39/803; H10F 39/811; H10F 39/8053
  See application file for complete search history.

(56) References Cited

U.S. PATENT DOCUMENTS

| | | | |
|---|---|---|---|
| 11,647,142 B2 * | 5/2023 | Yanagiwara | H04N 1/031 |
| 12,120,449 B2 * | 10/2024 | Asakura | H10F 39/811 |
| 12,226,313 B2 * | 2/2025 | Nakanishi | H04N 25/79 |

(Continued)

FOREIGN PATENT DOCUMENTS

| | | |
|---|---|---|
| JP | 3116687 B2 | 12/2000 |
| JP | 2001-309242 A | 11/2001 |

(Continued)

*Primary Examiner* — Marly S Camargo
(74) *Attorney, Agent, or Firm* — Kim & Stewart LLP

(57) ABSTRACT

According to one embodiment, there is a solid-state imaging device including a chip. The chip includes a pixel array, a plurality of signal lines, a plurality of output circuits and a plurality of output terminals. In the pixel array, a plurality of pixel groups each including two or more pixels is arrayed at least in a column direction. The plurality of signal lines corresponds to the plurality of pixel groups, each of the plurality of signal lines being connected to a corresponding pixel group. The plurality of output circuits corresponds to the plurality of signal lines, each of the plurality of output circuits being connected to a corresponding signal line. The plurality of output terminals corresponds to the plurality of output circuits, each of the plurality of output terminals being connected to a corresponding output circuit.

20 Claims, 16 Drawing Sheets

(56) References Cited

U.S. PATENT DOCUMENTS

| | | |
|---|---|---|
| 2002/0118407 A1 | 8/2002 | Komobuchi et al. |
| 2014/0232916 A1* | 8/2014 | Nagai ................. H10F 39/809 |
| | | 348/302 |
| 2018/0249035 A1* | 8/2018 | Fujiuchi ............... H10F 39/804 |
| 2019/0305028 A1* | 10/2019 | Soda .................... H10F 39/811 |
| 2022/0103712 A1 | 3/2022 | Yanagiwara et al. |
| 2024/0340552 A1* | 10/2024 | Niwa .................... H04N 25/75 |
| 2025/0150733 A1* | 5/2025 | Jung .................... H04N 25/616 |

FOREIGN PATENT DOCUMENTS

| | | |
|---|---|---|
| JP | 2002-330356 A | 11/2002 |
| JP | 2006-101191 A | 4/2006 |
| JP | 2022-056083 A | 4/2022 |

* cited by examiner

FIG.12

| | CHIP CH1_1 OUTPUT | CHIP CH1_2 OUTPUT | CHIP CH1_3 OUTPUT | CHIP CH1_4 OUTPUT |
|---|---|---|---|---|
| LN1 (OS1→IN1) | OS1 | OS1 | OS1 | OS1 |
| LN2 (OS2→IN2) | OS2 | OS2 | OS2 | OS2 |
| LN3 (OS3→IN3) | OS3 | OS3 | OS3 | OS3 |
| LN4 (OS4→IN4) | OS4 | OS4 | OS4 | OS4 |
| LN5 (OS5→IN5) | OS5 | OS5 | OS5 | OS5 |
| LN6 (OS6→IN6) | OS6 | OS6 | OS6 | OS6 | t31　t32　t33　t34　t35

SOLID-STATE IMAGING DEVICE

CROSS-REFERENCE TO RELATED APPLICATIONS

This application is based upon and claims the benefit of priority from Japanese Patent Application No. 2023-153867, filed on Sep. 20, 2023, the entire contents of which are incorporated herein by reference.

FIELD

Embodiments described herein relate generally to a solid-state imaging device.

BACKGROUND

In a solid-state imaging device in which a chip and an analog front end are connected to each other, a signal corresponding to an image acquired by the chip is output from the chip to the analog front end. In the solid-state imaging device, it is desirable that the chip and the analog front end be appropriately connected.

BRIEF DESCRIPTION OF THE DRAWINGS

FIG. 12 is a waveform diagram illustrating an operation of the solid-state imaging device according to the fourth modification of the embodiment;

DETAILED DESCRIPTION

In general, according to one embodiment, there is a solid-state imaging device including a chip. The chip includes a pixel array, a plurality of signal lines, a plurality of output circuits and a plurality of output terminals. In the pixel array, a plurality of pixel groups each including two or more pixels is arrayed at least in a column direction. The plurality of signal lines corresponds to the plurality of pixel groups, each of the plurality of signal lines being connected to a corresponding pixel group. The plurality of output circuits corresponds to the plurality of signal lines, each of the plurality of output circuits being connected to a corresponding signal line. The plurality of output terminals corresponds to the plurality of output circuits, each of the plurality of output terminals being connected to a corresponding output circuit.

Exemplary embodiments of a solid-state imaging device will be explained below in detail with reference to the accompanying drawings. The present invention is not limited to the following embodiments.

(Embodiment)

In a solid-state imaging device according to the embodiment, a chip and an analog front end are connected to each other, a signal corresponding to an image acquired by the chip is output from the chip to the analog front end, but a devisal for appropriately connecting the chip and the analog front end is provided.

Figure 1:
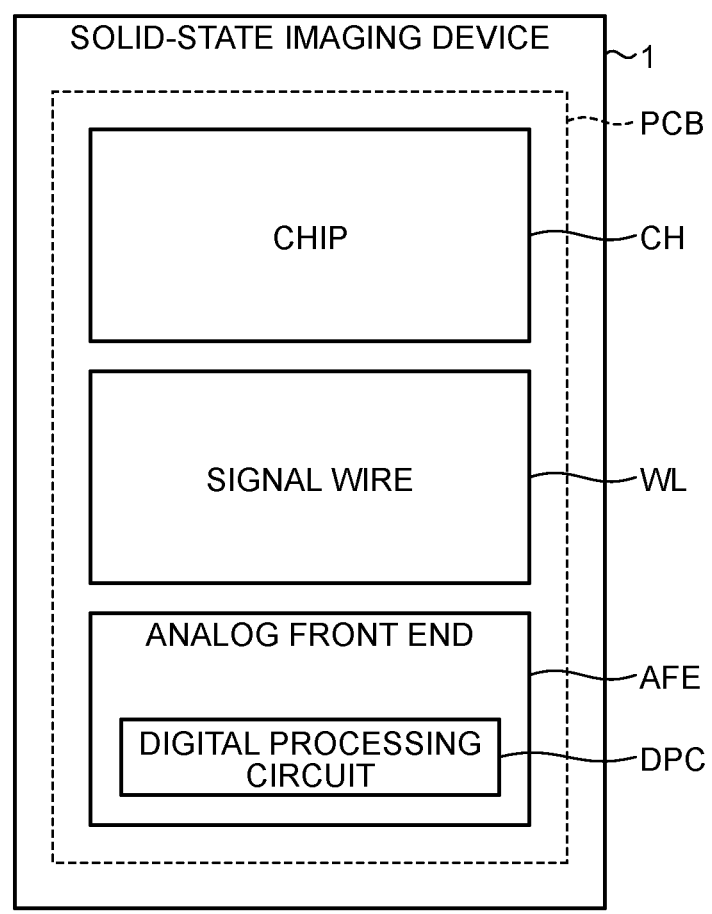
FIG. 1 is a diagram illustrating a schematic configuration of a solid-state imaging device according to an embodiment.

A solid-state imaging device 1 can be configured as illustrated in FIG. 1. FIG. 1 is a diagram illustrating a schematic configuration of the solid-state imaging device 1.

The solid-state imaging device 1 includes a chip CH, a signal wire WL, and an analog front end AFE. The chip CH, the signal wire WL, and the analog front end AFE may be mounted on a substrate PCB.

Figure 2:
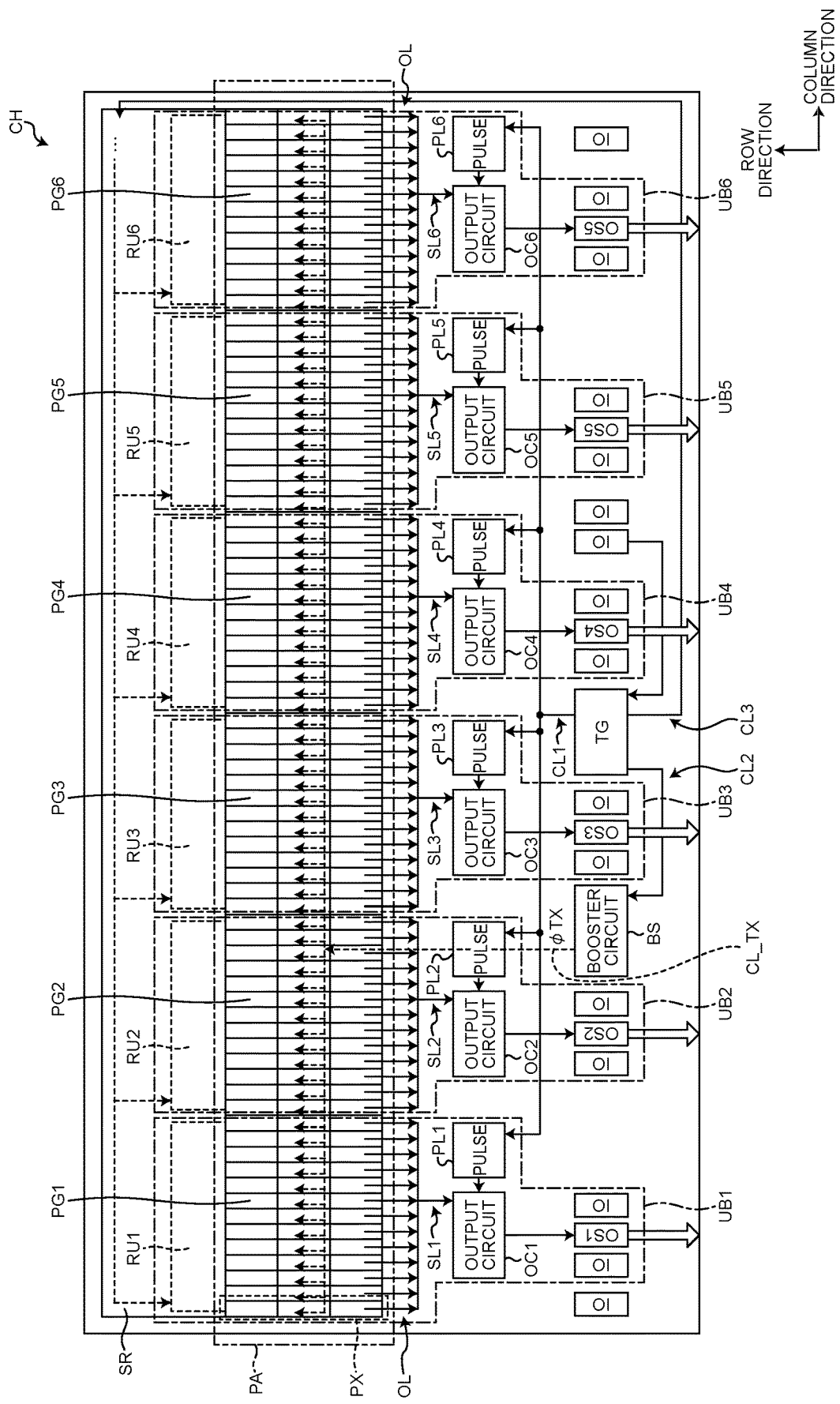
FIG. 2 is a diagram illustrating a schematic configuration of a chip according to the embodiment.

As illustrated in FIG. 2, the chip CH includes a pixel array PA, a plurality of signal lines SL1 to SL6, a plurality of output circuits OC1 to OC6, a plurality of pulse control circuits PL1 to PL6, a plurality of output terminals OS1 to OS6, a plurality of input/output terminals IO, a scanning circuit SR, a booster circuit BS, and a timing generation circuit TG.

FIG. 2 is a diagram illustrating a schematic configuration of the chip CH. In FIG. 2, a longitudinal direction of the chip CH is referred to as a column direction, and a direction perpendicular to the column direction in a plane along a surface of the chip CH is referred to as a row direction.

In the pixel array PA, a plurality of pixel groups PG1 to PG6 is arrayed at least in the column direction. FIG. 2 illustrates a configuration in which the plurality of pixel groups PG1 to PG6 is arrayed in the column direction in the pixel array PA. Each pixel group PG includes two or more pixels PX. In each pixel group PG, two or more pixels PX are arrayed at least in the column direction. FIG. 2 illustrates a configuration in which two or more pixels PX are arrayed in the column direction in each pixel group PG. In FIG. 2, one pixel PX is represented by a group of three rectangles arranged in the row direction.

The plurality of signal lines SL1 to SL6 corresponds to the plurality of pixel groups PG1 to PG6. Each signal line SL is connected to a corresponding pixel group PG. The plurality of signal lines SL1 to SL6 are separated from each other and arranged in the column direction. Each of the signal lines SL1 to SL6 is disposed between the pixel group PG and the output circuit OC in the row direction.

The plurality of output circuits OC1 to OC6 corresponds to the plurality of signal lines SL1 to SL6. Each output circuit OC is connected to a corresponding signal line SL. The plurality of output circuits OC1 to OC6 are separated from each other and arranged in the column direction. Each output circuit OC is disposed between the signal line SL and the output terminal OS in the row direction.

The plurality of pulse control circuits PL1 to PL6 corresponds to the plurality of output circuits OC1 to OC6. Each pulse control circuit PL is connected to a corresponding output circuit OC. The plurality of pulse control circuits PL1 to PL6 are separated from each other and arranged in the column direction. Each pulse control circuit PL is disposed between the signal line SL and the output terminal OS in the row direction.

The plurality of output terminals OS1 to OS6 corresponds to the plurality of output circuits OC1 to OC6. Each output terminal OS is connected to a corresponding output circuit OC. The plurality of output terminals OS1 to OS6 are separated from each other and arranged in the column direction. Each output terminal OS is disposed between the output circuit OC and an end of the chip CH in the row direction.

The scanning circuit SR is, for example, a shift register, and includes a plurality of register units RU1 to RU6. The plurality of register units RU1 to RU6 corresponds to the plurality of pixel groups PG1 to PG6. Each register unit RU supplies a control signal φSR to a corresponding pixel group PG.

The configuration including the register unit RU, the pixel group PG, the signal line SL, the output circuit oc, the pulse control circuit PL, and the output terminal OS constitutes a unit block UB. The chip CH includes a plurality of unit blocks UB1 to UB6. The plurality of unit blocks UB1 to UB6 may be configured to be operable independently of each other. Although the chip CH including six unit blocks UB1 to UB6 is illustrated in FIG. 2, the number of unit blocks UB included in the chip CH may be two to five or seven or more.

Figure 3:
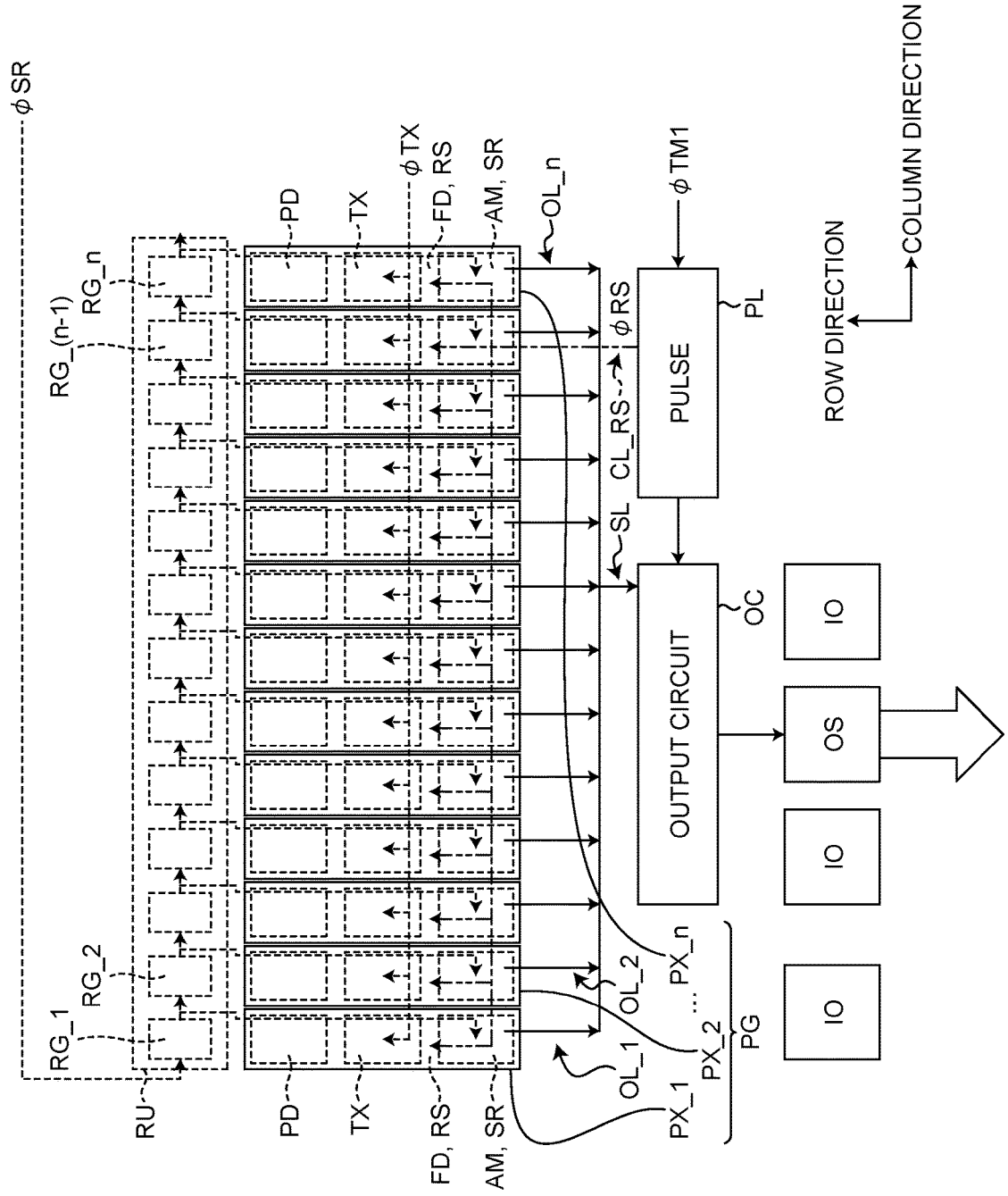
FIG. 3 is a diagram illustrating a configuration of a unit block according to the embodiment.
Figure 4:
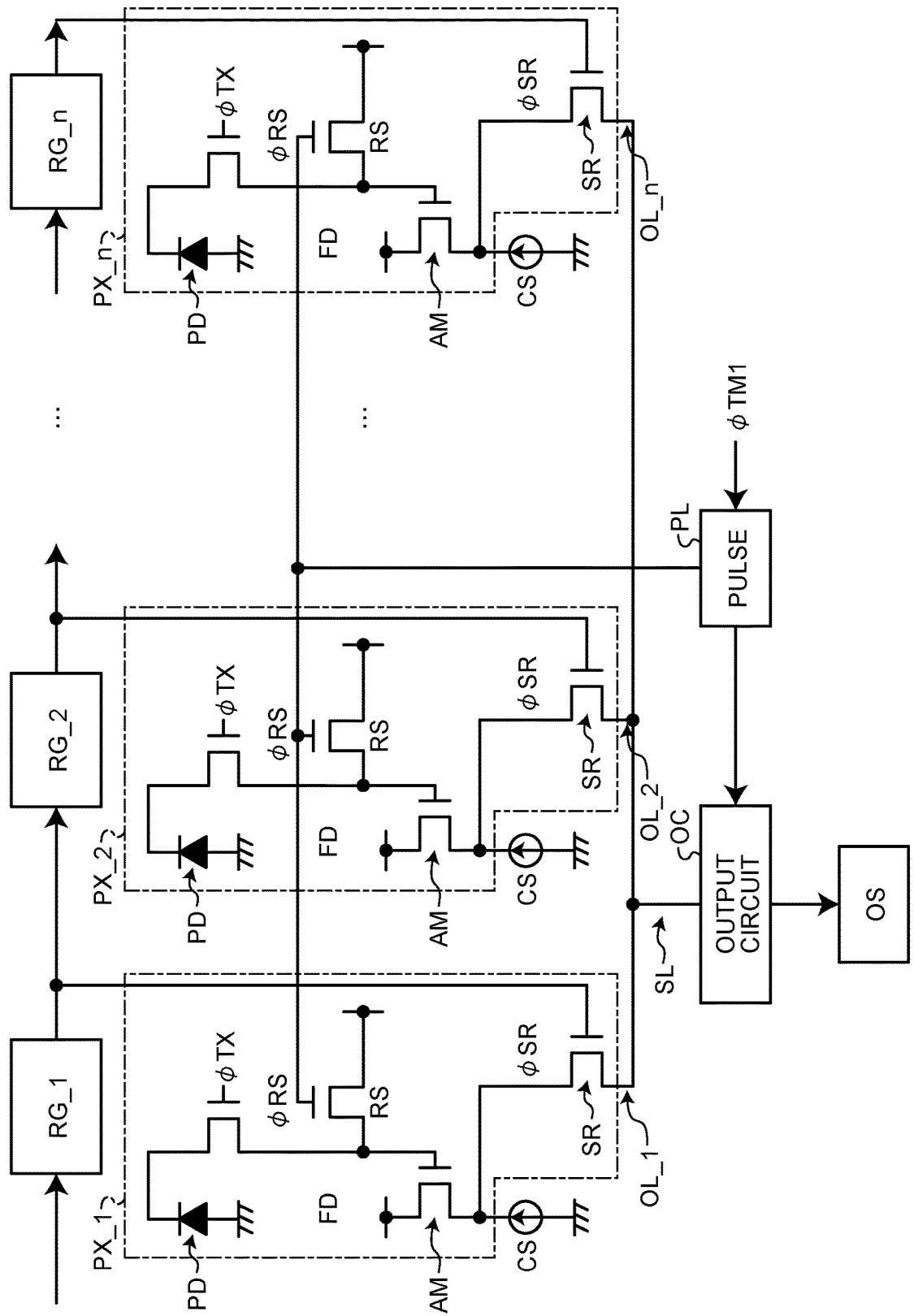
FIG. 4 is a diagram illustrating a circuit configuration of a unit block according to the embodiment.

Each unit block UB can be configured as illustrated in FIGS. 3 and 4. FIG. 3 is a diagram illustrating a configuration of a unit block. FIG. 4 is a diagram illustrating a circuit configuration of a unit block.

The unit block UB includes a register unit RU, a pixel group PG, n output lines OL_1 to OL_n, a signal line SL, an output circuit OC, a pulse control circuit PL, an output terminal OS, and one or more input/output terminals IO. n is an arbitrary integer of two or more.

The register unit RU includes n-stage registers RG_1 to RG_n. The n-stage registers RG_1 to RG_n are arranged in the column direction. The pixel group PG includes n pixels PX_1 to PX_n. The n pixels PX_1 to PX_n are arranged in the column direction. The n-stage registers RG_1 to RG_n, the n pixels PX_1 to PX_n, and the n output lines OL_1 to OL_n correspond to each other. The n output lines OL_1 to OL_n are arranged in the column direction. Each output line OL extends in the row direction.

The pulse control circuit PL is connected to each pixel PX via a control line CL_RS. The pulse control circuit PL generates a control signal QRS in accordance with a control signal φTM1 received from a timing control circuit TG, and supplies the control signal QRS to each pixel PX via the control line CL_RS.

Each pixel PX includes a photoelectric conversion unit PD, a transfer unit TX, a charge-voltage conversion unit FD, an amplification unit AM, a reset unit RS, and a selection unit SR.

The selection unit SR controls a selected state/non-selected state of the pixel PX. The selection unit SR includes, for example, a selection transistor. When the selection transistor receives the active level control signal φSR at the gate from a register RG, the selection transistor is turned on to put the pixel PX into a selected state. When the selection transistor receives the non-active level control signal φSR at the gate from the register RG, the selection transistor is turned off to put the pixel PX into a non-selected state.

The reset unit RS resets the charge-voltage conversion unit FD. The reset unit RS includes, for example, a reset transistor. When the reset transistor receives the active level control signal φSR at the gate from the pulse control circuit PL, the reset transistor is turned on to reset the charge-voltage conversion unit FD. When the reset transistor receives the non-active level control signal φSR at the gate from the pulse control circuit PL, the reset transistor is turned off to cancel the reset of the charge-voltage conversion unit FD.

The photoelectric conversion unit PD generates and accumulates a charge corresponding to light. The transfer unit TX includes, for example, a transfer transistor. When the transfer transistor receives the non-active level control signal φTX at the gate from the booster circuit BS, the transfer transistor is turned off to block the photoelectric conversion unit PD from the charge-voltage conversion unit FD. Thus, the charge accumulation operation is started in the photoelectric conversion unit PD. In a state in which the charge-voltage conversion unit FD is reset and the reset is canceled, when the transfer transistor receives the active level control signal φTX at the gate from the booster circuit BS, the transfer transistor is turned on to transfer the charge of the photoelectric conversion unit PD to the charge-voltage conversion unit FD. Thus, the charge accumulation operation is completed in the photoelectric conversion unit PD, and a voltage corresponding to the transferred charge is generated in the charge-voltage conversion unit FD.

When the pixel PX is in the selected state, the amplification unit AM performs a source follower operation together with a current source CS connected to the source side, and outputs a signal corresponding to the voltage of the charge-voltage conversion unit FD to the output circuit OC via the output line OL and the signal line SL.

In the register unit RU, each of the n-stage registers RG_1 to RG_n receives a timing control signal from the timing generation circuit TG. The register unit RU sequentially shifts the control signal QRS received by the first-stage register RG_1 from the first-stage register RG_1→the second-stage register RG_2→ . . . the (n−1)th-stage register RG_(n−1)→the n-stage register RG_n in synchronization with the timing control signal, and sequentially supplies the control signal φSR from their output nodes to the pixels PX_1, PX_2, . . . , PX (n−1), and PX_n.

For example, in a period TP1, the register unit RU supplies the non-active level control signal φSR to the selection unit SR of the pixels PX_1, PX_2, . . . , PX (n−1), and PX_n. Thus, the pixels PX_1, PX_2, . . . , PX (n−1), and PX_n go into a non-selected state.

In a period TP2 after the period TP1, the transfer unit TX (transfer transistor) of each of the pixels PX_1 to PX_n receives the active level control signal φTX at the gate, and transfers the charge of the photoelectric conversion unit PD to the charge-voltage conversion unit FD.

In a period TP3 after the period TP2, the register unit RU sequentially supplies the active level control signal φSR to the pixels PX_1, PX_2, ..., PX (n−1), and PX_n. Thus, the pixels PX_1, PX_2, ..., PX_(n−1), and PX_n go into a selected state. At the same time, the amplification units AM of the pixels PX_1, PX_2, ..., PX_(n−1), and PX_n sequentially output signals to the output circuit OC via the output line OL and the signal line SL.

That is, each unit block UB in the chip CH can sequentially transfer signals output from the pixels PX in a predetermined direction (in the case of FIG. 3, the row direction) while sequentially scanning the plurality of pixels PX in the pixel group PG in a predetermined direction (in the case of FIG. 3, the column direction).

The booster circuit BS illustrated in FIG. 2 is connected to each pixel PX via a control line CL_TX. The booster circuit BS boosts a voltage received from a power supply circuit (not illustrated), generates a control signal φTX, and supplies the control signal φTX to each pixel PX via the control line CL_TX.

The timing generation circuit TG is connected to each of the pulse control circuits PL1 to PL6 via a control line CL1, connected to the booster circuit BS via a control line CL2, and connected to the scanning circuit SR via a control line CL3. The timing generation circuit TG generates a timing control pulse φTM1 and supplies the timing control pulse φTM1 to the pulse control circuit PL of each unit block UB via the control line CL1. The timing generation circuit TG generates a timing control pulse φTM2 and supplies the timing control pulse φTM2 to the booster circuit BS via the control line CL2. The timing generation circuit TG generates a timing control pulse φTM3 and supplies the timing control pulse φTM3 to the scanning circuit SR via the control line CL3.

The signal wire WL illustrated in FIG. 1 is disposed between the chip CH and the analog front end AFE. The signal wire WL connects the plurality of output terminals OS1 to OS6 of the chip CH and the analog front end AFE.

The analog front end AFE is disposed between the signal wire WL and a subsequent circuit. The analog front end AFE receives a signal (analog signal) from the chip CH via the signal wire WL. The analog front end AFE includes a digital processing circuit DPC. The digital processing circuit DPC performs AD conversion on a signal (analog signal) from the chip CH and performs predetermined processing to generate a signal (digital signal). The analog front end AFE outputs the generated signal to a subsequent circuit.

In the chip CH, as illustrated in FIG. 2, configurations other than the booster circuit BS and the timing control circuit TG are divided or grouped into a plurality of unit blocks UB1 to UB6 that can operate independently of each other. That is, a plurality of pixels PX in the pixel array PA is grouped into the plurality of pixel groups PG. A plurality of output lines OL is grouped into an output line group corresponding to the unit block UB. In each unit block UB, the signal line SL, the output circuit OS, and the output terminal OS are configured independently of the other unit blocks UB. Thus, the chip CH is multi-output.

The chip CH can be configured to be able to flexibly cope with a change in the connection configuration (configuration of the signal wire WL) between the chip CH and the analog front end AFE according to the usage of the solid-state imaging device 1 at the time of manufacture.

For example, in a case where the solid-state imaging device 1 is manufactured for a speed-prioritized usage, the signal wire WL is configured to connect the chip CH and the analog front end AFE in parallel. In this case, the chip CH is set to output signals from the plurality of output terminals OS1 to OS6 in parallel according to the timing of the timing control pulse φTM1 of the timing generation circuit TG.

Alternatively, in a case where the solid-state imaging device 1 is manufactured for a cost-prioritized usage, the signal wire WL is configured to connect the chip CH and the analog front end AFE serially. In this case, the chip CH is set to serially output signals from the plurality of output terminals OS1 to OS6 according to the timing of the timing control pulse φTM1 of the timing generation circuit TG.

As described above, in the embodiment, in the solid-state imaging device 1, the chip CH includes the plurality of unit blocks UB1 to UB6 that can operate independently of each other. In each unit block UB, the signal line SL, the output circuit OS, and the output terminal OS are configured independently of the other unit blocks UB. Thus, the output of the chip CH can be multi-output. Thus, the chip CH can be configured to be able to flexibly cope with a change in the connection configuration (configuration of the signal wire WL) between the chip CH and the analog front end AFE according to the usage of the solid-state imaging device 1 at the time of manufacture. As a result, the design and manufacture of the chip CH used for manufacturing the speed-prioritized solid-state imaging device 1 and the chip CH used for manufacturing the cost-prioritized solid-state imaging device 1 can be made common. Accordingly, the manufacture of the chip CH can be QTAT, and the design and manufacturing costs of the chip CH can be reduced.

Figure 5:
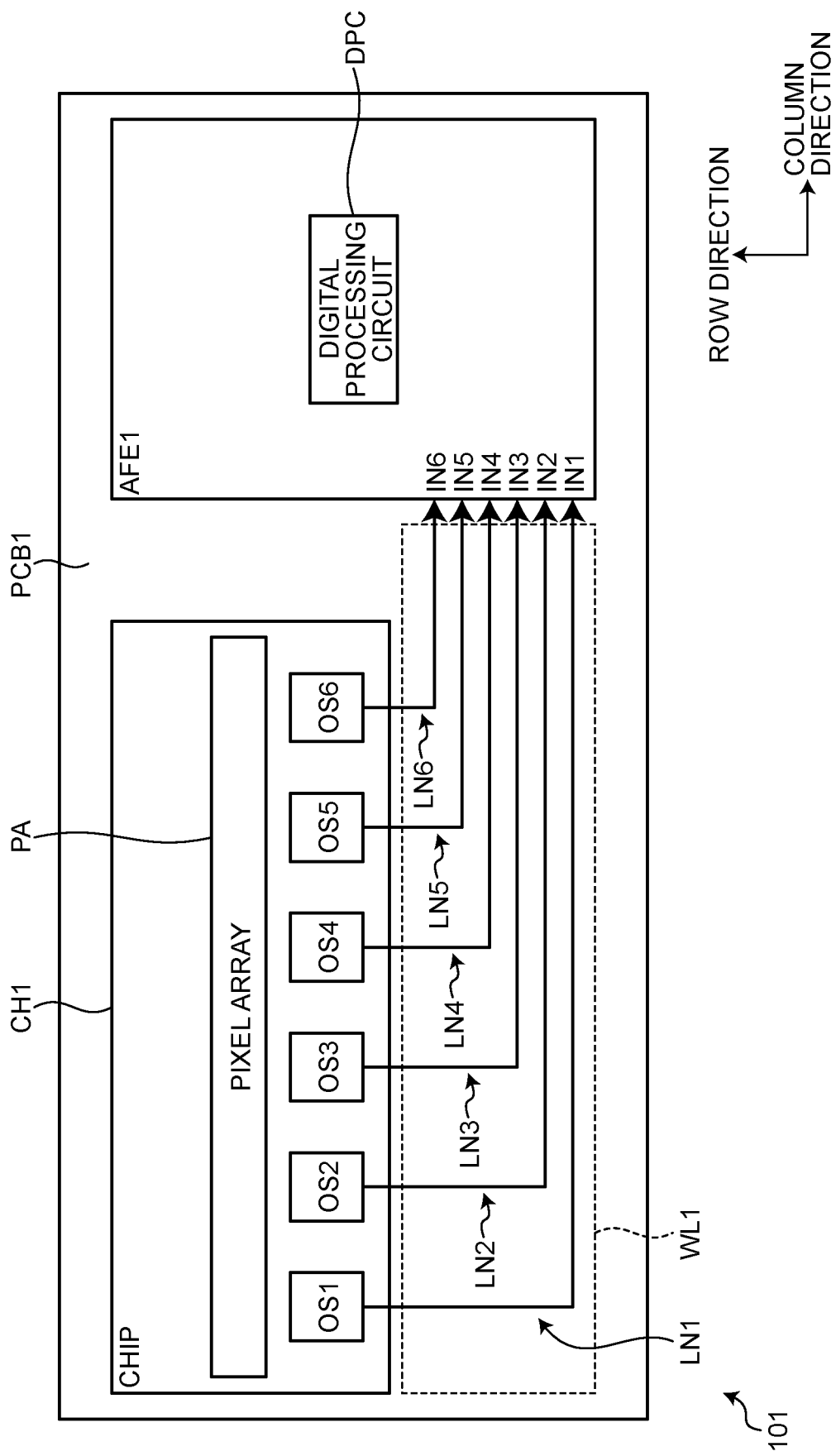
FIG. 5 is a diagram illustrating a configuration of a solid-state imaging device according to a first modification of the embodiment.

Note that, as a first modification of the embodiment, in a case where a solid-state imaging device 101 is manufactured for a speed-prioritized usage, the solid-state imaging device 101 may be configured as illustrated in FIG. 5. FIG. 5 is a diagram illustrating a configuration of the solid-state imaging device 101 according to the first modification of the embodiment.

The solid-state imaging device 101 includes a chip CH1, a signal wire WL1, and an analog front end AFE1. The chip CH1, the signal wire WL1, and the analog front end AFE1 may be mounted on a substrate PCB1. The substrate PCB1 may have a substantially plate shape in which the column direction is the longitudinal direction.

The chip CH1 can be configured similarly to the chip CH of the embodiment.

The analog front end AFEL is similar to that of the embodiment in that the analog front end AFE1 includes the digital processing circuit DPC, but is different from that of the embodiment in that the analog front end AFE1 further includes a plurality of input terminals IN1 to IN6. The analog front end AFE1 may be disposed on the substrate PCB1 at a position separated from the chip CH1 in the column direction. The plurality of input terminals IN1 to IN6 may be arranged in the row direction in a portion of the analog front end AFE1 on the chip side.

The signal wire WL1 is configured to connect the plurality of output terminals OS1 to OS6 of the chip CH1 and the plurality of input terminals IN1 to IN6 of the analog front end AFE1 in parallel.

The signal wire WL1 includes a plurality of lines LN1 to LN6. The line LN1 has one end connected to the output terminal OS1 of the chip CH1 and the other end connected to the input terminal IN1 of the analog front end AFE1.

The line LN2 has one end connected to the output terminal OS2 of the chip CH1 and the other end connected to the input terminal IN2 of the analog front end AFE1.

The line LN3 has one end connected to the output terminal OS3 of the chip CH1 and the other end connected to the input terminal IN3 of the analog front end AFE1.

The line LN4 has one end connected to the output terminal OS4 of the chip CH1 and the other end connected to the input terminal IN4 of the analog front end AFE1.

The line LN5 has one end connected to the output terminal OS5 of the chip CH1 and the other end connected to the input terminal IN5 of the analog front end AFE1.

The line LN6 has one end connected to the output terminal OS6 of the chip CH1 and the other end connected to the input terminal IN6 of the analog front end AFE1.

In the chip CH1, the plurality of output terminals OS1 to OS6 are arranged to be separated from each other in the column direction. Therefore, the plurality of lines LN1 to LN6 can be efficiently laid out in a substantially L shape that gradually decreases in size.

Signals output from the plurality of output terminals OS1 to OS6 of the chip CH1 are supplied to the plurality of input terminals IN1 to IN6 of the analog front end AFE1 via the plurality of lines LN1 to LN6.

In the analog front end AFE1, the input side of the digital processing circuit DPC is connected to the plurality of input terminals IN1 to IN6. The signal from the chip CH1 is supplied to the digital processing circuit DPC via the plurality of input terminals IN1 to IN6. The digital processing circuit DPC performs AD conversion on a signal (analog signal) from the chip CH1 and performs predetermined processing to generate a signal (digital signal).

The analog front end AFE1 outputs the generated signal to a subsequent circuit.

In the solid-state imaging device 101, the signal wire WL1 connects the plurality of output terminals OS1 to OS6 of the chip CH1 and the analog front end AFE1 in parallel. Accordingly, the chip CH1 is set to output the signals of the plurality of unit blocks UB1 to UB6 in parallel from the plurality of output terminals OS1 to OS6 to the analog front end AFE1.

Figure 6:
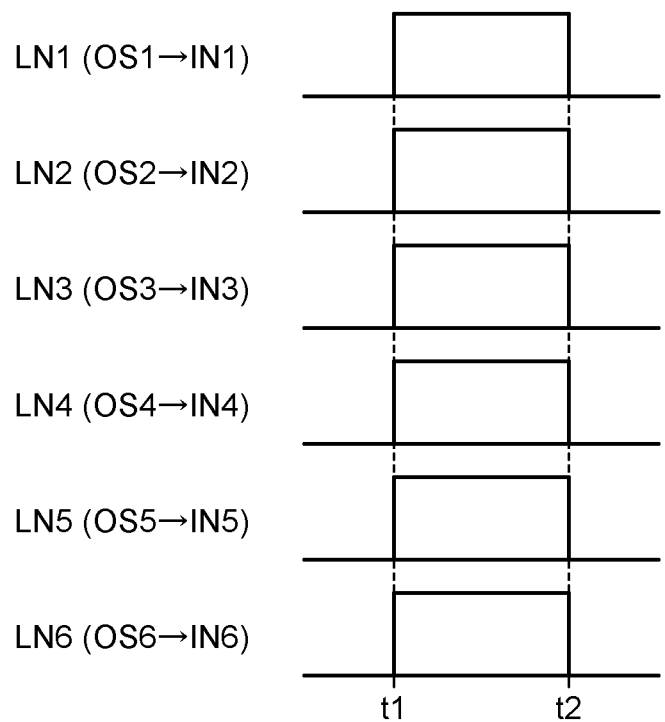
FIG. 6 is a waveform diagram illustrating an operation of the solid-state imaging device according to the first modification of the embodiment.

For example, in the chip CH1, the timing generation circuit TG supplies the active level timing control pulse φTM1 to the plurality of pulse control circuits PL1 to PL6 in parallel immediately before a timing t1 illustrated in FIG. 6. Each of the pulse control circuits PL1 to PL6 activates the corresponding output circuit OC and transfers the signal of the pixel PX to the output terminal OS in parallel with each other.

Thus, in a period of timings t1 to t2 illustrated in FIG. 6, the signal transfer from the output terminal OS1 to the input terminal IN1 through the line LN1, the signal transfer from the output terminal OS2 to the input terminal IN2 through the line LN2, the signal transfer from the output terminal OS3 to the input terminal IN3 through the line LN3, the signal supply from the output terminal OS4 to the input terminal IN4 through the line LN4, the signal transfer from the output terminal OS5 to the input terminal IN5 through the line LN5, and the signal transfer from the output terminal OS6 to the input terminal IN6 through the line LN6 are performed in parallel with each other.

In this manner, the chip CH1 can transfer the signals of the plurality of unit blocks UB1 to UB6 to the analog front end AFE1 at high speed.

Figure 7:
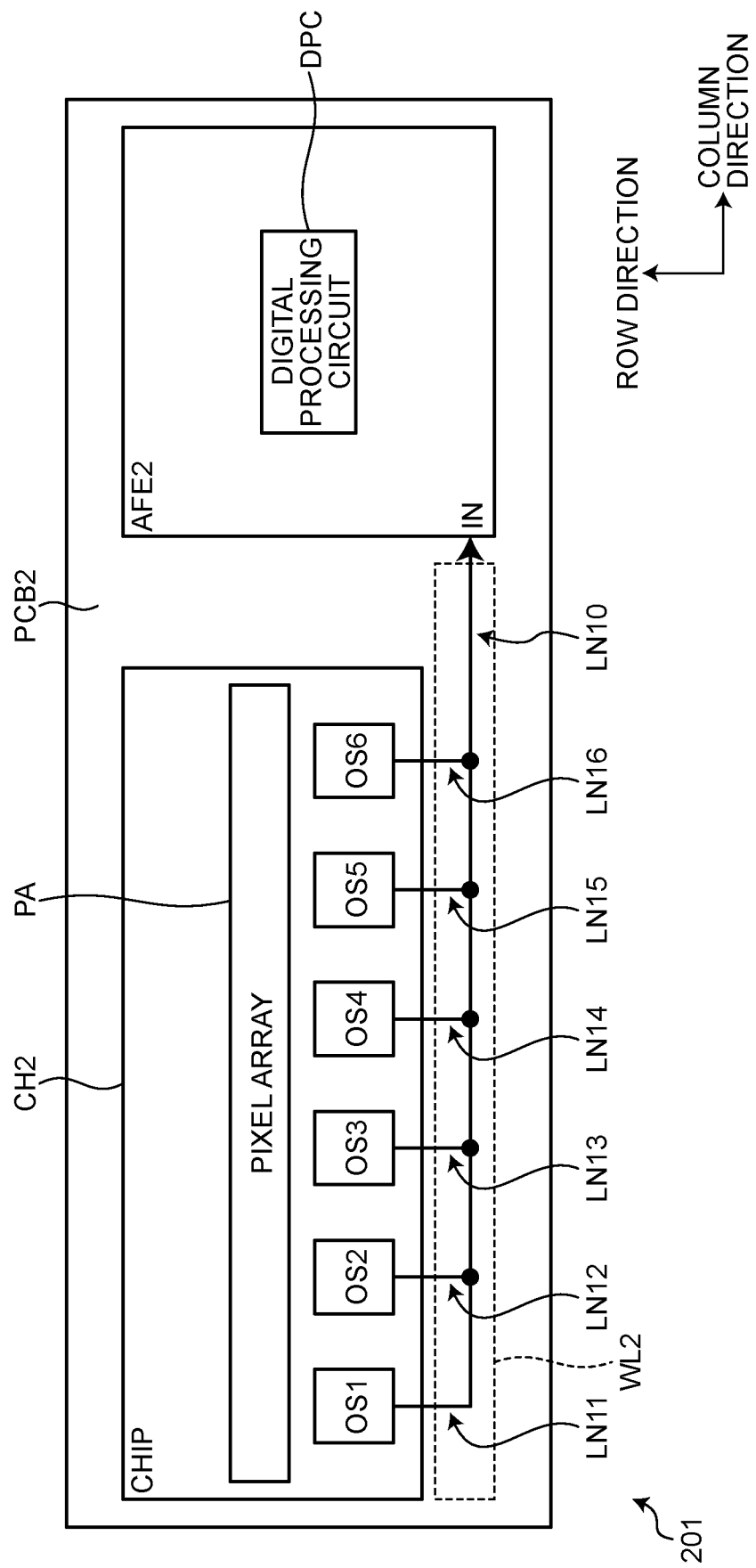
FIG. 7 is a diagram illustrating a configuration of a solid-state imaging device according to a second modification of the embodiment.

In addition, as a second modification of the embodiment, in a case where a solid-state imaging device 201 is manufactured for a cost-prioritized usage, the solid-state imaging device 201 may be configured as illustrated in FIG. 7. FIG. 7 is a diagram illustrating a configuration of the solid-state imaging device 201 according to the second modification of the embodiment.

The solid-state imaging device 201 includes a chip CH2, a signal wire WL2, and an analog front end AFE2. The chip CH2, the signal wire WL2, and the analog front end AFE2 may be mounted on a substrate PCB2. The substrate PCB2 may have a substantially plate shape in which the column direction is the longitudinal direction.

The chip CH2 can be configured similarly to the chip CH of the embodiment.

The analog front end AFE2 is similar to that of the embodiment in that the analog front end AFE2 includes the digital processing circuit DPC, but is different from that of the embodiment in that the analog front end AFE2 further includes an input terminal IN. The analog front end AFE2 may be disposed on the substrate PCB2 at a position separated from the chip CH2 in the column direction. The input terminal IN may be disposed in a portion of the analog front end AFE2 on the chip side.

The signal wire WL2 is configured to connect the plurality of output terminals OS1 to OS6 of the chip CH2 and the analog front end AFE2 serially.

The signal wire WL2 includes a plurality of lines LN11 to LN16 and a common line LN10.

The common line LN10 has one end extending to the vicinity of the output terminal OS1 of the chip CH2 and the other end connected to the input terminal IN of the analog front end AFE2.

The line LN11 has one end connected to the output terminal OS1 of the chip CH2 and the other end connected to the common line LN10.

The line LN12 has one end connected to the output terminal OS2 of the chip CH2 and the other end connected to the common line LN10.

The line LN13 has one end connected to the output terminal OS3 of the chip CH2 and the other end connected to the common line LN10.

The line LN14 has one end connected to the output terminal OS4 of the chip CH2 and the other end connected to the common line LN10.

The line LN15 has one end connected to the output terminal OS5 of the chip CH2 and the other end connected to the common line LN10.

The line LN16 has one end connected to the output terminal OS6 of the chip CH2 and the other end connected to the common line LN10.

In the chip CH2, the plurality of output terminals OS1 to OS6 are arranged to be separated from each other in the column direction. Therefore, the common line LN10 can be extended in the column direction so as to be efficiently laid out to form a substantially L shape that gradually decreases in size with the plurality of lines LN11 to LN16 each extending in the row direction.

Signals output from the plurality of output terminals OS1 to OS6 of the chip CH2 are supplied to the input terminal IN of the analog front end AFE2 via the plurality of lines LN1 to LN6 and the common line LN10.

In the analog front end AFE2, the input side of the digital processing circuit DPC is connected to the input terminal IN. The signal output from the chip CH2 is supplied to the digital processing circuit DPC via the input terminal IN. The digital processing circuit DPC performs AD conversion on a signal (analog signal) from the chip CH2 and performs predetermined processing to generate a signal (digital signal).

The analog front end AFE2 outputs the generated signal to a subsequent circuit.

In the solid-state imaging device 201, the signal wire WL2 connects the plurality of output terminals OS1 to OS6 of the chip CH2 and the input terminal IN of the analog front end AFE2 serially. Accordingly, the chip CH2 is set to serially output the signals of the plurality of unit blocks UB1 to UB6 from the plurality of output terminals OS1 to OS6 to the input terminal IN of the analog front end AFE1.

Figure 8:
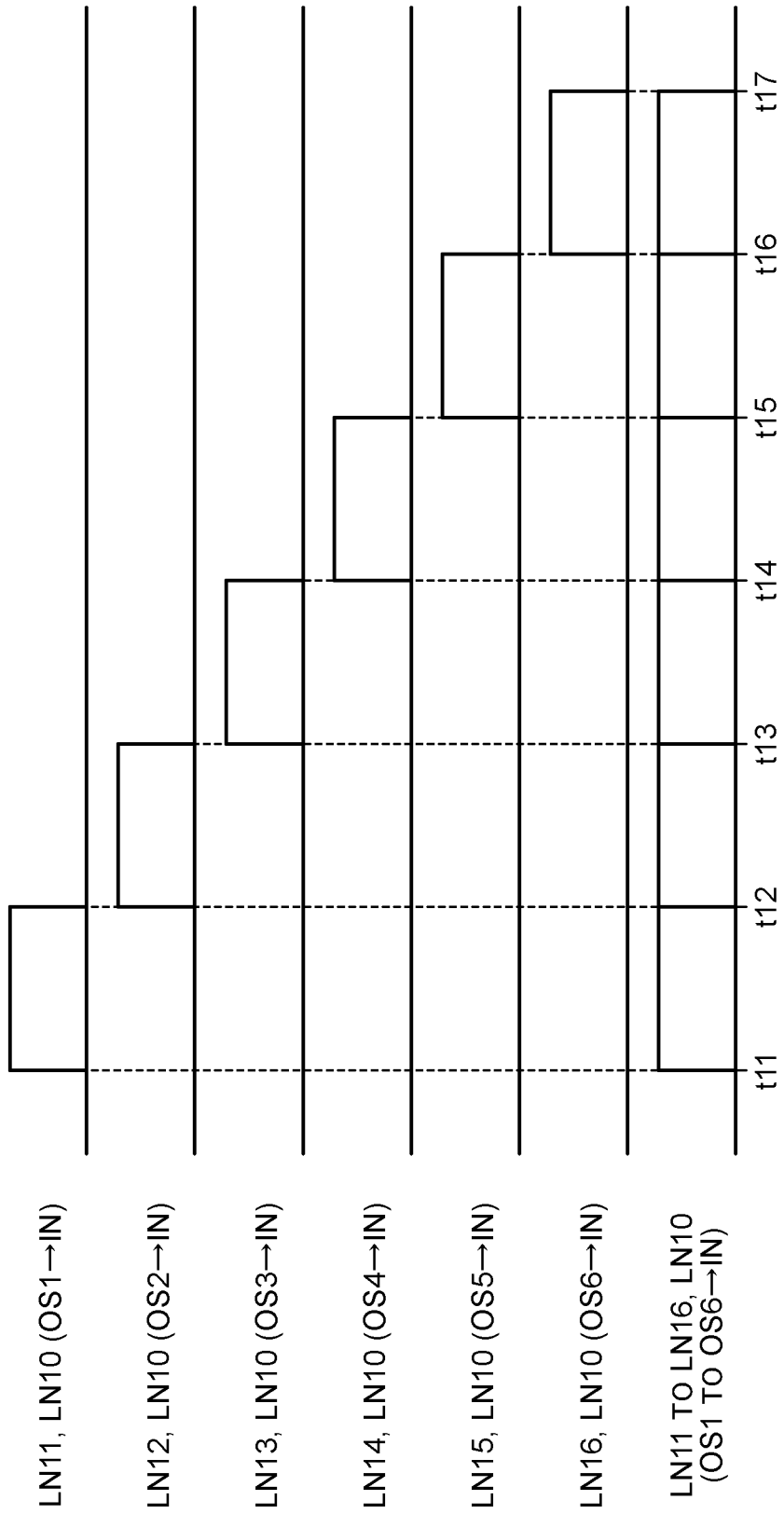
FIG. 8 is a waveform diagram illustrating an operation of the solid-state imaging device according to the second modification of the embodiment.

For example, in the chip CH2, the timing generation circuit TG supplies the active level timing control pulse φTM1 to the plurality of pulse control circuits PL1 to PL6 serially immediately before timings t11 to t16 illustrated in FIG. 8. Each of the pulse control circuits PL1 to PL6 sequentially activates the corresponding output circuit OC and transfers the signal of the pixel PX to the output terminal OS.

Thus, the signal transfer from the output terminal OS1 to the input terminal IN through the line LN11 and the common line 10 in the period of timings t11 to t12 illustrated in FIG. 8, the signal transfer from the output terminal OS2 to the input terminal IN through the line LN12 and the common line 10 in the period of timings t12 to t13, the signal transfer from the output terminal OS3 to the input terminal IN through the line LN13 and the common line 10 in the period of timings t13 to t14, the signal supply from the output terminal OS4 to the input terminal IN through the line LN14 and the common line 10 in the period of timings t14 to t15, the signal transfer from the output terminal OS5 to the input terminal IN through the line LN15 and the common line 10 in the period of timings t15 to t16, and the signal transfer from the output terminal OS6 to the input terminal IN through the line LN16 and the common line 10 in the period of timings t16 to t17 are serially performed.

Here, the total length of the signal wire WL2 is shorter than that of the signal wire WL1 (see FIG. 5), and the signal wire WL2 can be manufactured at lower cost. In the analog front end AFE2, the number of input terminals IN is smaller than that of the analog front end AFE1 (see FIG. 5), the circuit configuration between the input terminal IN and the digital processing circuit DPC can be simplified, and a low-priced version analog front end can be used.

In this manner, the chip CH2 can transfer the signals of the plurality of unit blocks UB1 to UB6 to the analog front end AFE2 at low cost.

Figure 9:
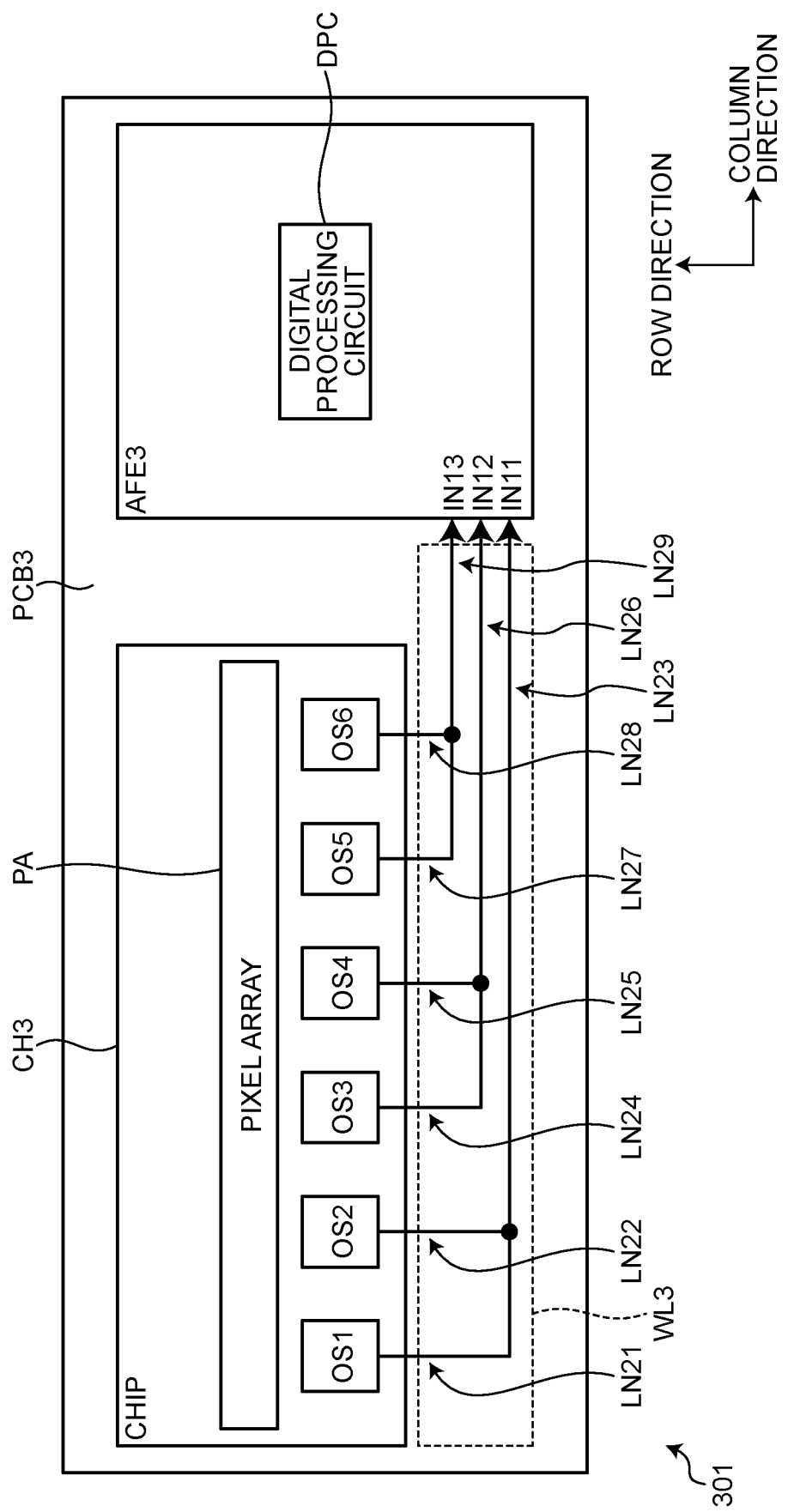
FIG. 9 is a diagram illustrating a configuration of a solid-state imaging device according to a third modification of the embodiment.

In addition, as a third modification of the embodiment, in a case where a solid-state imaging device 301 is manufactured for a usage in consideration of speed and cost, the solid-state imaging device 301 may be configured as illustrated in FIG. 9. FIG. 9 is a diagram illustrating a configuration of the solid-state imaging device 301 according to the third modification of the embodiment.

The solid-state imaging device 301 includes a chip CH3, a signal wire WL3, and an analog front end AFE3. The chip CH3, the signal wire WL3, and the analog front end AFE3 may be mounted on a substrate PCB3. The substrate PCB3 may have a substantially plate shape in which the column direction is the longitudinal direction.

The chip CH3 can be basically configured similarly to the chip CH of the embodiment, but differs from that of the embodiment on the points described below.

The plurality of output circuits OC1 to OC6 are grouped into a plurality of output circuit groups each including two or more output circuits OC. The plurality of output circuits OC1 to OC6 may be grouped into three output circuit groups (OC1 and OC2), (OC3 and OC4), and (OC5 and OC6).

The plurality of output terminals OS1 to OS6 are grouped into a plurality of output terminal groups each including two or more output terminals OS. The plurality of output terminals OS1 to OS6 may be grouped into three output terminal groups (OS1 and OS2), (OS3 and OS4), and (OS5 and OS6).

The analog front end AFE3 is similar to that of the embodiment in that the analog front end AFE3 includes the digital processing circuit DPC, but is different from that of the embodiment in that the analog front end AFE3 further includes a plurality of input terminals IN11 to IN13. The analog front end AFE3 may be disposed on the substrate PCB3 at a position separated from the chip CH3 in the column direction. The plurality of input terminals IN11 to IN13 may be arranged in the row direction in a portion of the analog front end AFE3 on the chip side.

The signal wire WL3 is configured to connect the plurality of output terminal groups of the chip CH3 and the plurality of input terminals IN11 to IN13 of the analog front end AFE3 in parallel, and connect two or more output terminals OS of each output terminal group and the input terminal of the analog front end AFE3 serially.

The signal wire WL3 includes a plurality of lines LN21 and LN22, a common line LN23, a plurality of lines LN24 and LN25, a common line LN26, a plurality of lines LN27 and LN28, and a common line LN29.

The common line LN23 has one end extending to the vicinity of the output terminal OS1 of the chip CH3 and the other end connected to the input terminal IN11 of the analog front end AFE3.

The line LN21 has one end connected to the output terminal OS1 of the chip CH3 and the other end connected to the common line LN23.

The line LN22 has one end connected to the output terminal OS2 of the chip CH3 and the other end connected to the common line LN23.

The common line LN26 has one end extending to the vicinity of the output terminal OS3 of the chip CH3 and the other end connected to the input terminal IN12 of the analog front end AFE3.

The line LN24 has one end connected to the output terminal OS4 of the chip CH3 and the other end connected to the common line LN26.

The line LN25 has one end connected to the output terminal OS5 of the chip CH3 and the other end connected to the common line LN26.

The common line LN29 has one end extending to the vicinity of the output terminal OS5 of the chip CH3 and the other end connected to the input terminal IN13 of the analog front end AFE3.

The line LN27 has one end connected to the output terminal OS5 of the chip CH3 and the other end connected to the common line LN29.

The line LN28 has one end connected to the output terminal OS6 of the chip CH3 and the other end connected to the common line LN29.

In the chip CH3, the plurality of output terminal groups is arranged to be separated from each other in the column direction. Therefore, the plurality of lines LN1 to LN6 can be efficiently laid out in a substantially L shape that gradually decreases in size for each output terminal group.

For each output terminal group, the common lines LN23, LN26, and LN29 can be extended in the column direction so as to be efficiently laid out to form a substantially L shape that gradually decreases in size with the plurality of lines LN21, LN22, LN24, LN25, LN27, and LN28 each extending in the row direction.

Signals output from the plurality of output terminals OS1 and OS2 of the chip CH3 are supplied to the input terminal IN11 of the analog front end AFE3 via the plurality of lines LN21 and LN22 and the common line LN23. Signals output from the plurality of output terminals OS3 and OS4 of the chip CH3 are supplied to the input terminal IN12 of the analog front end AFE3 via the plurality of lines LN24 and LN25 and the common line LN26. Signals output from the plurality of output terminals OS5 and OS6 of the chip CH3 are supplied to the input terminal IN13 of the analog front end AFE3 via the plurality of lines LN27 and LN28 and the common line LN29.

In the analog front end AFE3, the input side of the digital processing circuit DPC is connected to the plurality of input terminals IN11 to IN13. The signal from the chip CH3 is supplied to the digital processing circuit DPC via the plurality of input terminals IN11 to IN13. The digital processing circuit DPC performs AD conversion on a signal (analog signal) from the chip CH3 and performs predetermined processing to generate a signal (digital signal).

The analog front end AFE3 outputs the generated signal to a subsequent circuit.

In the solid-state imaging device 301, the plurality of output terminal groups of the chip CH3 and the plurality of input terminals IN11 to IN13 of the analog front end AFE3 are connected in parallel, and two or more output terminals OS of each output terminal group and the input terminal of the analog front end AFE3 are connected serially. Accordingly, the chip CH3 is set to output the signals of the plurality of unit blocks UB from the plurality of output terminal groups to the plurality of input terminals IN11 to IN13 of the analog front end AFE1 in parallel, and output the signals of the plurality of unit blocks UB from two or more output terminals OS of each output terminal group to the input terminal of the analog front end AFE3 serially.

Figure 10:
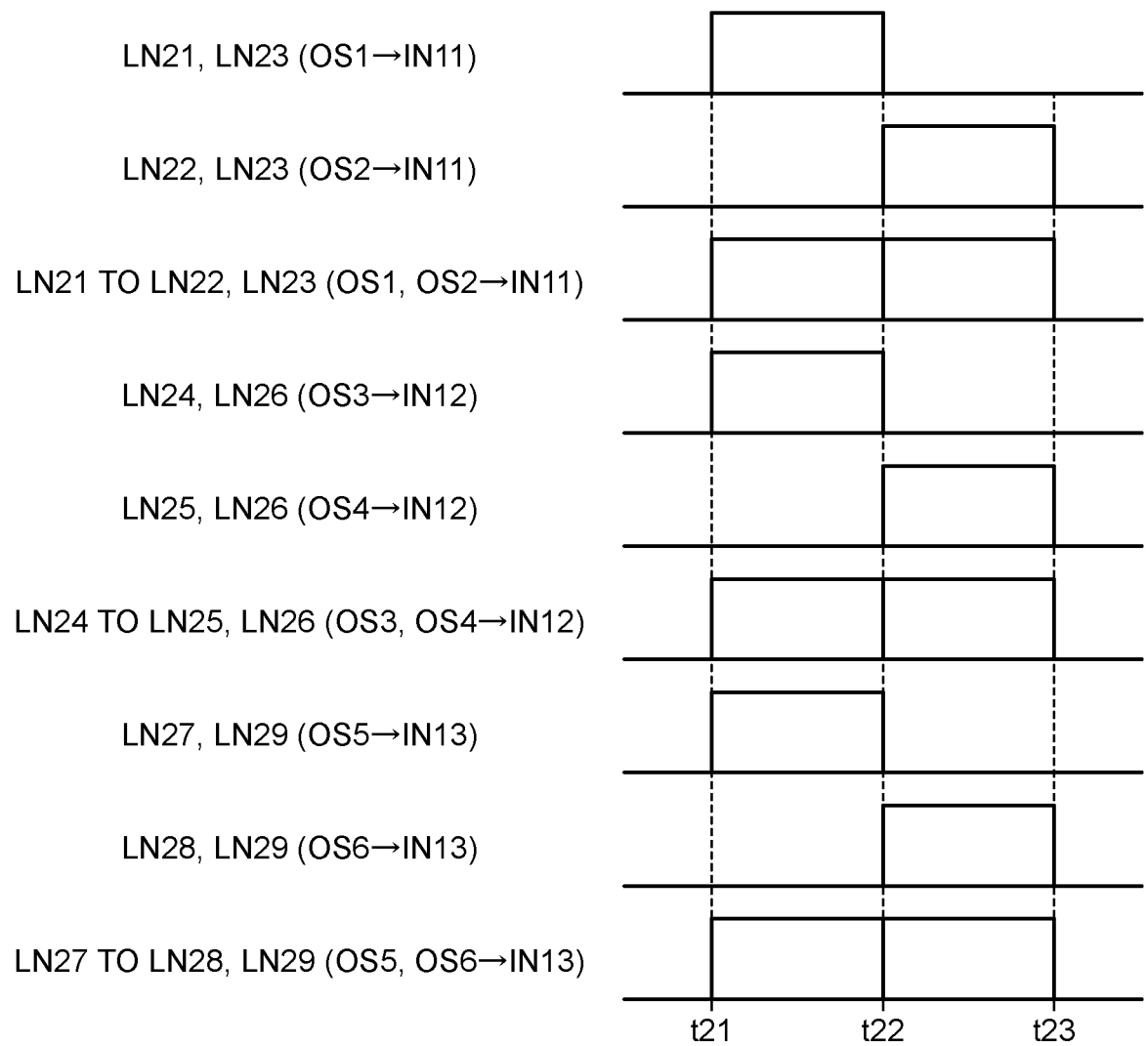
FIG. 10 is a waveform diagram illustrating an operation of the solid-state imaging device according to the third modification of the embodiment.

For example, in the chip CH3, the timing generation circuit TG supplies the active level timing control pulse φTM1 to the odd-numbered pulse control circuits PL1, PL3, and PL5 in parallel immediately before a timing t21 illustrated in FIG. 10. The odd-numbered pulse control circuits PL1, PL3, and PL5 activate the corresponding output circuits OC1, OC3, and OC5 in parallel with each other and transfer the signal of the pixel PX to the output terminals OS1, OS3, and OS5.

Thus, in the period of timings t21 to t22, the signal transfer from the output terminal OS1 to the input terminal IN11 through the line LN21 and the common line LN23, the signal transfer from the output terminal OS3 to the input terminal IN12 through the line LN24 and the common line LN26, and the signal transfer from the output terminal OS5 to the input terminal IN13 through the line LN27 and the common line LN29 are performed in parallel with each other.

Immediately before a timing t22, the active level timing control pulse φTM1 is supplied to the even-numbered pulse control circuits PL2, PL4, and PL6 in parallel in parallel with each other. The even-numbered pulse control circuits PL2, PL4, and PL6 activate the corresponding output circuits OC2, OC4, and OC6 in parallel with each other and transfer the signal of the pixel PX to the output terminals OS2, OS4, and OS6.

Thus, in the period of timings t22 to t23, the signal transfer from the output terminal OS2 to the input terminal IN11 through the line LN22 and the common line LN23, the signal transfer from the output terminal OS4 to the input terminal IN12 through the line LN25 and the common line LN26, and the signal transfer from the output terminal OS6 to the input terminal IN13 through the line LN28 and the common line LN29 are performed in parallel with each other.

That is, the signal transfer from the odd-numbered output terminals to the input terminals IN11 to LN13 through the lines and the common lines in the period of timings t21 to t22 and the signal transfer from the even-numbered output terminals to the input terminals IN11 to IN13 through the lines and the common lines in the period of timings t22 to t23 are serially performed.

Here, the total length of the signal wire WL3 is shorter than that of the signal wire WL1 (see FIG. 5), and the signal wire WL3 can be manufactured at lower cost. In the analog front end AFE3, the number of input terminals IN11 to IN13 is smaller than that of the analog front end AFE1 (see FIG. 5), the circuit configuration between the input terminals IN11 to IN13 and the digital processing circuit DPC can be simplified, and a low-priced version analog front end can be used.

In this manner, the chip CH3 can transfer the signals of the plurality of unit blocks UB1 to UB6 to the analog front end AFE3 in a form in which both speed and cost are taken into consideration.

Figure 11:
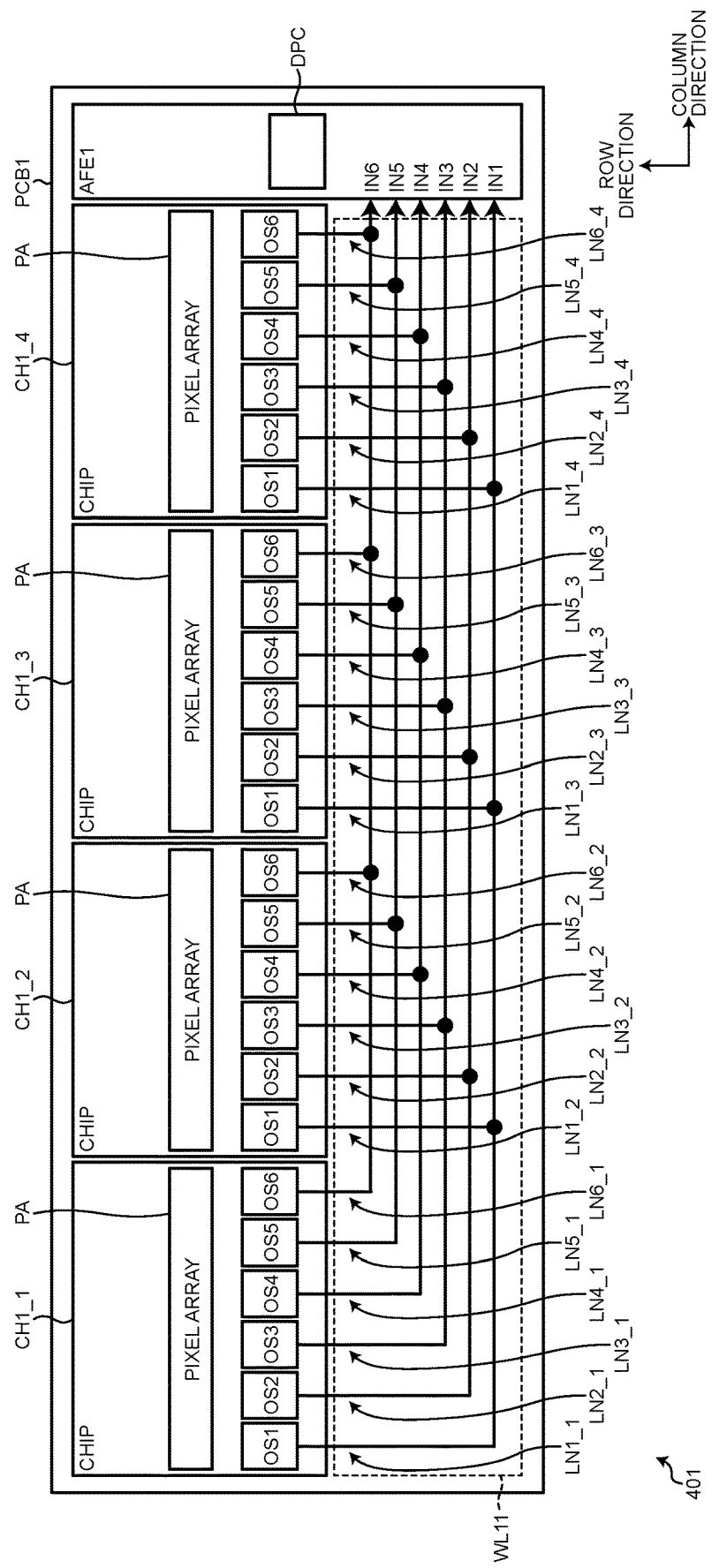
FIG. 11 is a diagram illustrating a configuration of a solid-state imaging device according to a fourth modification of the embodiment.

In addition, as a fourth modification of the embodiment, in a case where a solid-state imaging device 401 is manufactured for a speed-prioritized usage as illustrated in FIG. 11, the solid-state imaging device 401 may include a plurality of chips as illustrated in FIG. 11. FIG. 11 is a diagram illustrating a configuration of the solid-state imaging device 401 according to the fourth modification of the embodiment.

In the solid-state imaging device 401, the chip CH1 is extended to a plurality of chips CH1_1 to CH1_4, and the signal wire WL1 is replaced with a signal wire WL11, with respect to the solid-state imaging device 101 (see FIG. 5).

The plurality of chips CH1_1 to CH1_4 is separated from each other and arranged in the column direction on the substrate PCB1. Thus, it is possible to increase the read length that can be scanned at a time by the solid-state imaging device 401. The analog front end AFE1 may be disposed on the substrate PCB1 at a position separated from the plurality of chips CH1_1 to CH1_4 in the column direction.

The signal wire WL11 connects the plurality of chips CH1_1 to CH1_4 and the analog front end AFE1 serially. The signal wire WL11 connects the plurality of output terminals OS1 to OS6 of each chip CH1 and the plurality of input terminals IN1 to IN6 of the analog front end AFE1 in parallel.

The signal wire WL11 includes a plurality of lines LN1_1 to LN6_1, LN1_2 to LN6_2, LN1_3 to LN6_3, and LN1_4 to LN6_4.

One ends of the lines LN1_1 to LN1_4 are connected to the output terminals OS1 of the chips CH1_1 to CH1_4, respectively. The other end of the line LN1_1 is connected to the input terminal IN1 of the analog front end AFE1, and the other ends of the lines LN1_2 to LN1_4 are connected to the line LN1_1.

One ends of the lines LN2_1 to LN2_4 are connected to the output terminals OS2 of the chips CH1_1 to CH1_4, respectively. The other end of the line LN2_1 is connected to the input terminal IN2 of the analog front end AFE1, and the other ends of the lines LN2_2 to LN2_4 are connected to the line LN2_1.

One ends of the lines LN3_1 to LN3_4 are connected to the output terminals OS3 of the chips CH1_1 to CH1_4, respectively. The other end of the line LN3_1 is connected to the input terminal IN3 of the analog front end AFE1, and the other ends of the lines LN3_2 to LN3_4 are connected to the line LN3_1.

One ends of the lines LN4_1 to LN4_4 are connected to the output terminals OS4 of the chips CH1_1 to CH1_4, respectively. The other end of the line LN4_1 is connected to the input terminal IN4 of the analog front end AFE1, and the other ends of the lines LN4_2 to LN4_4 are connected to the line LN4_1.

One ends of the lines LN5_1 to LN5_4 are connected to the output terminals OS5 of the chips CH1_1 to CH1_4, respectively. The other end of the line LN5_1 is connected to the input terminal IN5 of the analog front end AFE1, and the other ends of the lines LN5_2 to LN5_4 are connected to the line LN5_1.

One ends of the lines LN6_1 to LN6_4 are connected to the output terminals OS6 of the chips CH1_1 to CH1_4, respectively. The other end of the line LN6_1 is connected to the input terminal IN6 of the analog front end AFE1, and the other ends of the lines LN6_2 to LN6_4 are connected to the line LN6_1.

The plurality of chips CH1_1 to CH1_4 is arranged to be separated from each other in the column direction on the substrate PCB1. Therefore, the line group can be extended in the column direction so as to be efficiently laid out to form a substantially L shape that gradually decreases in size with the plurality of line groups each extending in the row direction.

In each chip CH1, the plurality of output terminals OS1 to OS6 are arranged to be separated from each other in the column direction. Therefore, the plurality of lines LN1 to LN6 can be efficiently laid out in a substantially L shape that gradually decreases in size.

In the solid-state imaging device 401, the plurality of chips CH1_1 to CH1_4 is set to perform output to the analog front end AFE1 serially. Note that it is similar to the solid-state imaging device 101 in that each chip CH1 is set to output the signals of the plurality of unit blocks UB1 to UB6 in parallel from the plurality of output terminals OS1 to OS6 to the analog front end AFE1.

For example, in the chip CH1_1, the timing generation circuit TG supplies the active level timing control pulse φTM1 to the plurality of pulse control circuits PL1 to PL6 in parallel immediately before a timing t31 illustrated in FIG. 12. Each of the pulse control circuits PL1 to PL6 activates the corresponding output circuit OC and transfers the signal of the pixel PX to the output terminal OS in parallel with each other.

Thus, in a period of timings t31 to t32, regarding the chip CH1_1, the signal transfer from the output terminal OS1 to the input terminal IN1 through the line LN1, the signal transfer from the output terminal OS2 to the input terminal IN2 through the line LN2, the signal transfer from the output terminal OS3 to the input terminal IN3 through the line LN3, the signal supply from the output terminal OS4 to the input terminal IN4 through the line LN4, the signal transfer from the output terminal OS5 to the input terminal IN5 through the line LN5, and the signal transfer from the output terminal OS6 to the input terminal IN6 through the line LN6 are performed in parallel with each other.

In the chip CH1_2, the timing generation circuit TG supplies the active level timing control pulse φTM1 to the plurality of pulse control circuits PL1 to PL6 in parallel immediately before a timing t32. Each of the pulse control circuits PL1 to PL6 activates the corresponding output circuit OC and transfers the signal of the pixel PX to the output terminal OS in parallel with each other.

Thus, in a period of timings t32 to t33, regarding the chip CH1_2, the signal transfer from the output terminal OS1 to the input terminal IN1 through the line LN1, the signal transfer from the output terminal OS2 to the input terminal IN2 through the line LN2, the signal transfer from the output terminal OS3 to the input terminal IN3 through the line LN3, the signal supply from the output terminal OS4 to the input terminal IN4 through the line LN4, the signal transfer from the output terminal OS5 to the input terminal IN5 through the line LN5, and the signal transfer from the output terminal OS6 to the input terminal IN6 through the line LN6 are performed in parallel with each other.

In the chip CH1_3, the timing generation circuit TG supplies the active level timing control pulse φTM1 to the plurality of pulse control circuits PL1 to PL6 in parallel immediately before a timing t33. Each of the pulse control circuits PL1 to PL6 activates the corresponding output circuit OC and transfers the signal of the pixel PX to the output terminal OS in parallel with each other.

Thus, in a period of timings t33 to t34, regarding the chip CH1_3, the signal transfer from the output terminal OS1 to the input terminal IN1 through the line LN1, the signal transfer from the output terminal OS2 to the input terminal IN2 through the line LN2, the signal transfer from the output terminal OS3 to the input terminal IN3 through the line LN3, the signal supply from the output terminal OS4 to the input terminal IN4 through the line LN4, the signal transfer from the output terminal OS5 to the input terminal IN5 through the line LN5, and the signal transfer from the output terminal OS6 to the input terminal IN6 through the line LN6 are performed in parallel with each other.

In the chip CH1_4, the timing generation circuit TG supplies the active level timing control pulse φTM1 to the plurality of pulse control circuits PL1 to PL6 in parallel immediately before a timing t34. Each of the pulse control circuits PL1 to PL6 activates the corresponding output circuit OC and transfers the signal of the pixel PX to the output terminal OS in parallel with each other.

Thus, in a period of timings t34 to t35, regarding the chip CH1_4, the signal transfer from the output terminal OS1 to the input terminal IN1 through the line LN1, the signal transfer from the output terminal OS2 to the input terminal IN2 through the line LN2, the signal transfer from the output terminal OS3 to the input terminal IN3 through the line LN3, the signal supply from the output terminal OS4 to the input terminal IN4 through the line LN4, the signal transfer from the output terminal OS5 to the input terminal IN5 through the line LN5, and the signal transfer from the output terminal OS6 to the input terminal IN6 through the line LN6 are performed in parallel with each other.

In this manner, each CH1_1 to CH1_4 can transfer the signals of the plurality of unit blocks UB1 to UB6 to the analog front end AFE1 at high speed.

Figure 13:
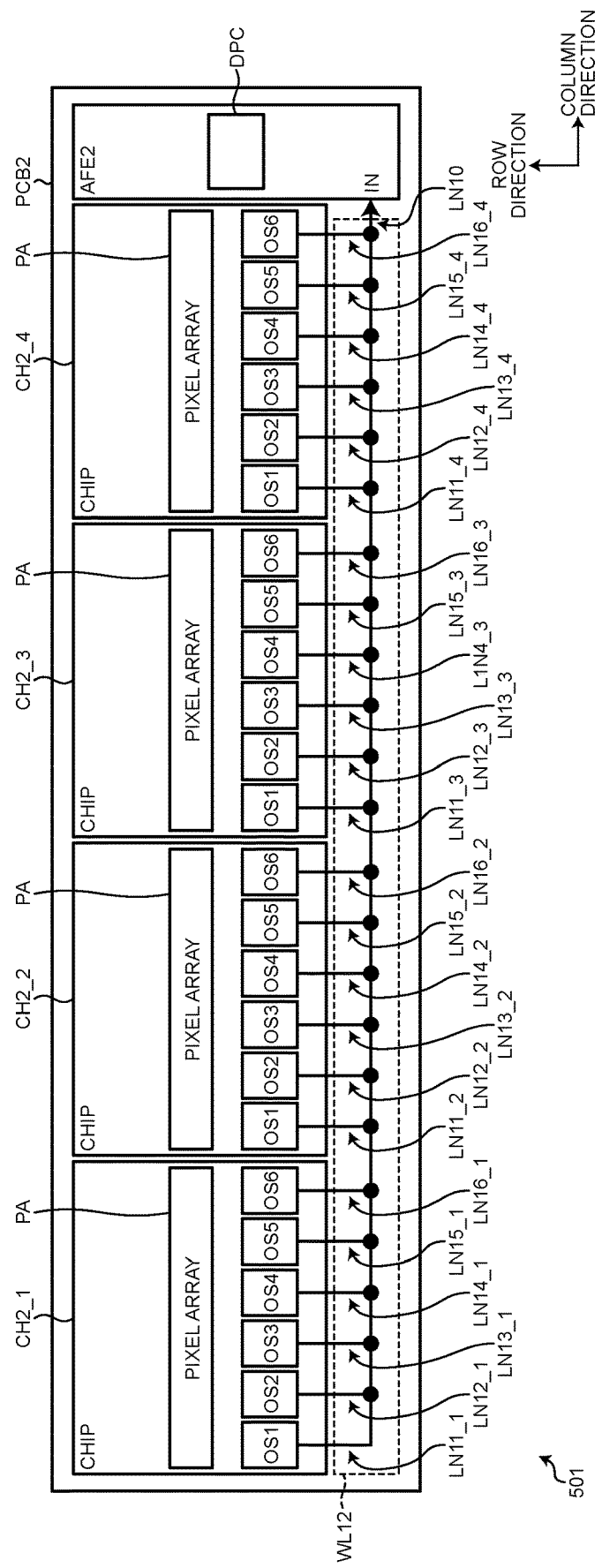
FIG. 13 is a diagram illustrating a configuration of a solid-state imaging device according to a fifth modification of the embodiment.

In addition, as a fifth modification of the embodiment, in a case where a solid-state imaging device 501 is manufactured for a cost-prioritized usage as illustrated in FIG. 13, the solid-state imaging device 501 may include a plurality of chips as illustrated in FIG. 13. FIG. 13 is a diagram illustrating a configuration of the solid-state imaging device 501 according to the fifth modification of the embodiment.

In the solid-state imaging device 501, the chip CH2 is extended to a plurality of chips CH2_1 to CH2_4, and the signal wire WL2 is replaced with a signal wire WL12, with respect to the solid-state imaging device 201 (see FIG. 7).

The plurality of chips CH2_1 to CH2_4 are separated from each other and arranged in the column direction on the substrate PCB2. Thus, it is possible to increase the read length that can be scanned at a time by the solid-state imaging device 501. The analog front end AFE2 may be disposed on the substrate PCB2 at a position separated from the plurality of chips CH2_1 to CH2_4 in the column direction.

The signal wire WL12 connects the plurality of chips CH2_1 to CH2_4 and the analog front end AFE2 serially. The signal wire WL12 connects the plurality of output terminals OS1 to OS6 of each chip CH2 and the plurality of input terminals IN1 to IN6 of the analog front end AFE2 serially.

The signal wire WL12 includes a plurality of lines LN11_1 to LN16_1, LN11_2 to LN16_2, LN11_3 to LN16_3, and LN11_4 to LN16_4, and a common line LN10.

The common line LN10 has one end extending to the vicinity of the output terminal OS1 of the chip CH2_1 and the other end connected to the input terminal IN of the analog front end AFE2.

One ends of the lines LN11_1 to LN11_4 are connected to the output terminals OS1 of the chips CH2_1 to CH2_4, respectively, and the other ends are connected to the common line LN10.

One ends of the lines LN12_1 to LN12_4 are connected to the output terminals OS2 of the chips CH2_1 to CH2_4, respectively, and the other ends are connected to the common line LN10.

One ends of the lines LN13_1 to LN13_4 are connected to the output terminals OS3 of the chips CH2_1 to CH2_4, respectively, and the other ends are connected to the common line LN10.

One ends of the lines LN14_1 to LN14_4 are connected to the output terminals OS4 of the chips CH2_1 to CH2_4, respectively, and the other ends are connected to the common line LN10.

One ends of the lines LN15_1 to LN15_4 are connected to the output terminals OS5 of the chips CH2_1 to CH2_4, respectively, and the other ends are connected to the common line LN10.

One ends of the lines LN16_1 to LN16_4 are connected to the output terminals OS6 of the chips CH2_1 to CH2_4, respectively, and the other ends are connected to the common line LN10.

The plurality of chips CH2_1 to CH2_4 are arranged to be separated from each other in the column direction on the substrate PCB2. Therefore, the common line group can be extended in the column direction so as to be efficiently laid out to form a substantially L shape that gradually decreases in size with the plurality of line groups each extending in the row direction.

In each chip CH2, the plurality of output terminals OS1 to OS6 are arranged to be separated from each other in the column direction. Therefore, the plurality of lines LN11 to LN16 can be efficiently laid out in a substantially L shape that gradually decreases in size.

In the solid-state imaging device 501, the plurality of chips CH2_1 to CH2_4 are set to perform output to the analog front end AFE2 serially. Note that it is similar to the solid-state imaging device 201 in that each chip CH2 is set to output the signals of the plurality of unit blocks UB1 to UB6 serially from the plurality of output terminals OS1 to OS6 to the analog front end AFE2.

Figure 14:
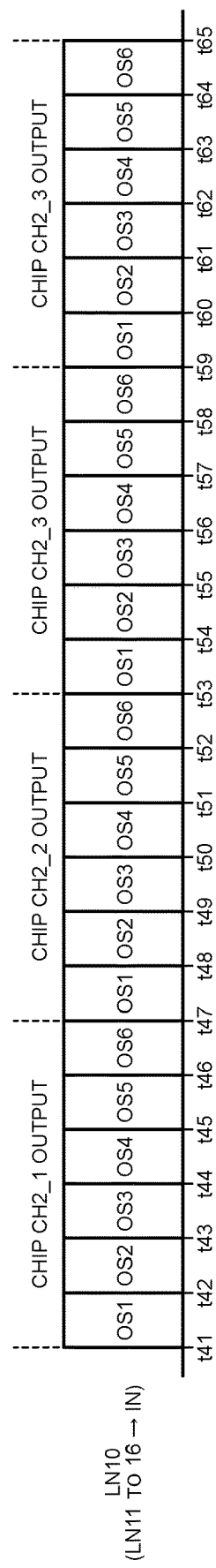
FIG. 14 is a waveform diagram illustrating an operation of the solid-state imaging device according to the fifth modification of the embodiment.

For example, in the chip CH2_1, the timing generation circuit TG supplies the active level timing control pulse φTM1 to the plurality of pulse control circuits PL1 to PL6 in parallel immediately before each of timings t41 to t46 illustrated in FIG. 14. Each of the pulse control circuits PL1 to PL6 activates the corresponding output circuit OC and transfers the signal of the pixel PX to the output terminal OS in parallel with each other.

Thus, the signal transfer from the output terminal OS1 to the input terminal IN through the line LN11 and the common line 10 in the period of timings t41 to t42, the signal transfer from the output terminal OS2 to the input terminal IN through the line LN12 and the common line 10 in the period of timings t42 to t43, the signal transfer from the output terminal OS3 to the input terminal IN through the line LN13 and the common line 10 in the period of timings t43 to t44, the signal supply from the output terminal OS4 to the input terminal IN through the line LN14 and the common line 10 in the period of timings t44 to t45, the signal transfer from the output terminal OS5 to the input terminal IN through the line LN15 and the common line 10 in the period of timings t45 to t46, and the signal transfer from the output terminal OS6 to the input terminal IN through the line LN16 and the common line 10 in the period of timings t46 to t47 are serially performed.

In the chip CH2_2, the timing generation circuit TG supplies the active level timing control pulse φTM1 to the plurality of pulse control circuits PL1 to PL6 in parallel immediately before each of timings t47 to t52. Each of the pulse control circuits PL1 to PL6 activates the corresponding output circuit OC and transfers the signal of the pixel PX to the output terminal OS in parallel with each other.

Thus, the signal transfer from the output terminal OS1 to the input terminal IN through the line LN11 and the common line 10 in the period of timings t47 to t48, the signal transfer from the output terminal OS2 to the input terminal IN through the line LN12 and the common line 10 in the period of timings t48 to t49, the signal transfer from the output terminal OS3 to the input terminal IN through the line LN13 and the common line 10 in the period of timings t49 to t50, the signal supply from the output terminal OS4 to the input terminal IN through the line LN14 and the common line 10 in the period of timings t50 to t51, the signal transfer from the output terminal OS5 to the input terminal IN through the line LN15 and the common line 10 in the period of timings t51 to t52, and the signal transfer from the output terminal OS6 to the input terminal IN through the line LN16 and the common line 10 in the period of timings t52 to t53 are serially performed.

In the chip CH2_3, the timing generation circuit TG supplies the active level timing control pulse φTM1 to the plurality of pulse control circuits PL1 to PL6 in parallel immediately before each of timings t53 to t58. Each of the pulse control circuits PL1 to PL6 activates the corresponding output circuit OC and transfers the signal of the pixel PX to the output terminal OS in parallel with each other.

Thus, the signal transfer from the output terminal OS1 to the input terminal IN through the line LN11 and the common line 10 in the period of timings t53 to t54, the signal transfer from the output terminal OS2 to the input terminal IN through the line LN12 and the common line 10 in the period of timings t54 to t55, the signal transfer from the output terminal OS3 to the input terminal IN through the line LN13 and the common line 10 in the period of timings t55 to t56, the signal supply from the output terminal OS4 to the input terminal IN through the line LN14 and the common line 10 in the period of timings t56 to t57, the signal transfer from the output terminal OS5 to the input terminal IN through the line LN15 and the common line 10 in the period of timings t57 to t58, and the signal transfer from the output terminal OS6 to the input terminal IN through the line LN16 and the common line 10 in the period of timings t58 to t59 are serially performed.

In the chip CH2_4, the timing generation circuit TG supplies the active level timing control pulse QTM1 to the plurality of pulse control circuits PL1 to PL6 in parallel immediately before each of timings t59 to t64. Each of the pulse control circuits PL1 to PL6 activates the corresponding output circuit OC and transfers the signal of the pixel PX to the output terminal OS in parallel with each other.

Thus, the signal transfer from the output terminal OS1 to the input terminal IN through the line LN11 and the common line 10 in the period of timings t59 to t60, the signal transfer from the output terminal OS2 to the input terminal IN through the line LN12 and the common line 10 in the period of timings t60 to t61, the signal transfer from the output terminal OS3 to the input terminal IN through the line LN13 and the common line 10 in the period of timings t61 to t62, the signal supply from the output terminal OS4 to the input terminal IN through the line LN14 and the common line 10 in the period of timings t62 to t63, the signal transfer from the output terminal OS5 to the input terminal IN through the line LN15 and the common line 10 in the period of timings t63 to t64, and the signal transfer from the output terminal OS6 to the input terminal IN through the line LN16 and the common line 10 in the period of timings t64 to t65 are serially performed.

Here, the total length of the signal wire WL12 is shorter than that of the signal wire WL11 (see FIG. 11), and the signal wire WL12 can be manufactured at lower cost. In the analog front end AFE2, the number of input terminals IN is smaller than that of the analog front end AFE1 (see FIG. 11), the circuit configuration between the input terminal IN and the digital processing circuit DPC can be simplified, and a low-priced version analog front end can be used.

In this manner, each CH2_1 to CH2_4 can transfer the signals of the plurality of unit blocks UB1 to UB6 to the analog front end AFE2 at low cost.

Figure 15:
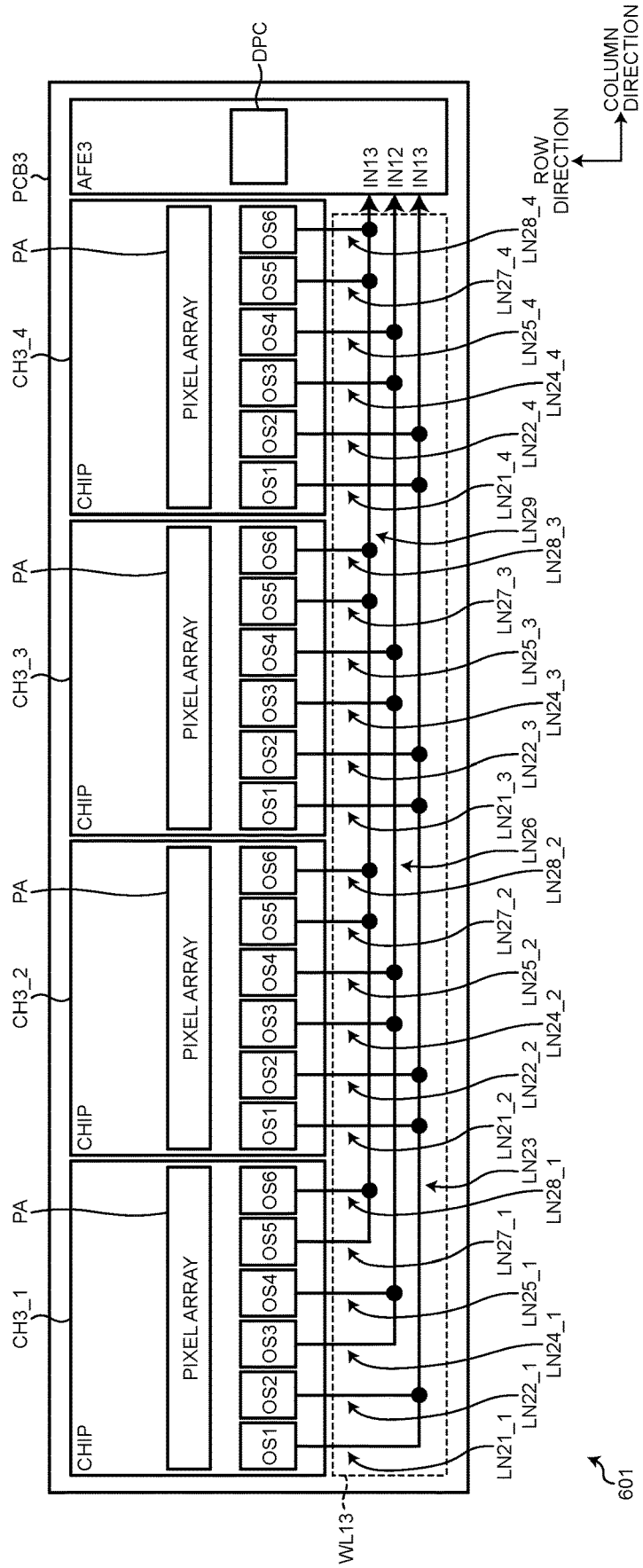
FIG. 15 is a diagram illustrating a configuration of a solid-state imaging device according to a sixth modification of the embodiment.

In addition, as a sixth modification of the embodiment, in a case where a solid-state imaging device 601 is manufactured for a usage in consideration of speed and cost as illustrated in FIG. 15, the solid-state imaging device 601 may include a plurality of chips as illustrated in FIG. 15. FIG. 15 is a diagram illustrating a configuration of the solid-state imaging device 601 according to the sixth modification of the embodiment.

In the solid-state imaging device 601, the chip CH3 is extended to a plurality of chips CH3_1 to CH3_4, and the signal wire WL3 is replaced with a signal wire WL13, with respect to the solid-state imaging device 301 (see FIG. 9).

The plurality of chips CH3_1 to CH3_4 is separated from each other and arranged in the column direction on the substrate PCB3. Thus, it is possible to increase the read length that can be scanned at a time by the solid-state imaging device 601. The analog front end AFE3 may be disposed on the substrate PCB3 at a position separated from the plurality of chips CH3_1 to CH3_4 in the column direction.

The signal wire WL13 connects the plurality of chips CH3_1 to CH3_4 and the analog front end AFE3 serially. The signal wire WL13 connects the plurality of output terminal groups of each chip CH3 and the plurality of input terminals IN11 to IN13 of the analog front end AFE3 in parallel, and connects two or more output terminals OS of each output terminal group and the input terminal of the analog front end AFE3 serially.

The signal wire WL13 includes a plurality of lines LN21_1 to LN21_4 and LN22_1 to LN22_4, common lines LN23_1 to LN23_4, a plurality of lines LN24_1 to LN24_4 and LN25_1 to LN25_4, common lines LN26_1 to LN26_4, a plurality of lines LN27_1 to LN27_4 and LN28_1 to LN28_4, and common lines LN29_1 to LN29_4.

The common line LN23 has one end extending to the vicinity of the output terminal OS1 of the chip CH3_1 and the other end connected to the input terminal IN11 of the analog front end AFE3.

One ends of the lines LN21_1 to LN21_4 are connected to the output terminals OS1 of the chips CH3_1 to CH3_4, respectively, and the other ends are connected to the common line LN23.

One ends of the lines LN22_1 to LN22_4 are connected to the output terminals OS2 of the chips CH3_1 to CH3_4, respectively, and the other ends are connected to the common line LN23.

The common line LN26 has one end extending to the vicinity of the output terminal OS3 of the chip CH3_1 and the other end connected to the input terminal IN12 of the analog front end AFE3.

One ends of the lines LN24_1 to LN24_4 are connected to the output terminals OS3 of the chips CH3_1 to CH3_4, respectively, and the other ends are connected to the common line LN26.

One ends of the lines LN25_1 to LN25_4 are connected to the output terminals OS4 of the chips CH3_1 to CH3_4, respectively, and the other ends are connected to the common line LN26.

The common line LN29 has one end extending to the vicinity of the output terminal OS5 of the chip CH3 and the other end connected to the input terminal IN13 of the analog front end AFE3.

One ends of the lines LN27_1 to LN27_4 are connected to the output terminals OS5 of the chips CH3_1 to CH3_4, respectively, and the other ends are connected to the common line LN29.

One ends of the lines LN28_1 to LN28_4 are connected to the output terminals OS6 of the chips CH3_1 to CH3_4, respectively, and the other ends are connected to the common line LN29.

The plurality of chips CH3_1 to CH3_4 is arranged to be separated from each other in the column direction on the substrate PCB3. Therefore, the line group can be extended in the column direction so as to be efficiently laid out to form a substantially L shape that gradually decreases in size with the plurality of line groups each extending in the row direction.

In each chip CH3, the plurality of output terminal groups is arranged to be separated from each other in the column direction. Therefore, the plurality of lines LN1 to LN6 can be efficiently laid out in a substantially L shape that gradually decreases in size for each output terminal group.

In the solid-state imaging device 601, the plurality of chips CH3_1 to CH3_4 is set to perform output to the analog front end AFE3 serially. Note that it is similar to the solid-state imaging device 301 in that each chip CH3 is set to output the signals of the plurality of unit blocks UB from the plurality of output terminal groups to the plurality of input terminals IN11 to IN13 of the analog front end AFE1 in parallel, and output the signals of the plurality of unit blocks UB from two or more output terminals OS of each output terminal group to the input terminal of the analog front end AFE3 serially.

Figure 16:
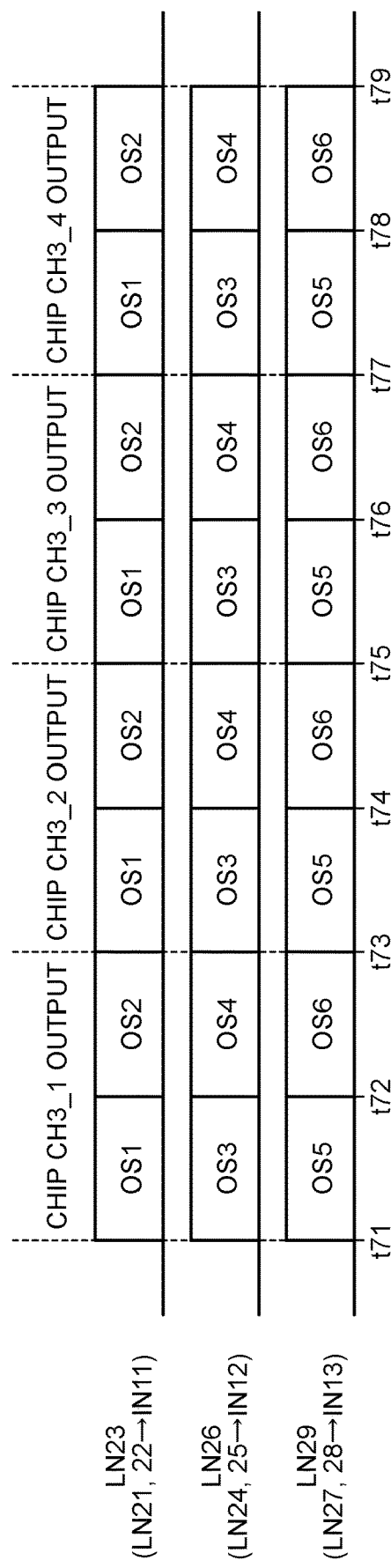
FIG. 16 is a waveform diagram illustrating an operation of the solid-state imaging device according to the sixth modification of the embodiment.

For example, in the chip CH3_1, the timing generation circuit TG supplies the active level timing control pulse φTM1 to the odd-numbered pulse control circuits PL1, PL3, and PL5 in parallel immediately before a timing t71 illustrated in FIG. 16. The odd-numbered pulse control circuits PL1, PL3, and PL5 activate the corresponding output circuits OC1, OC3, and OC5 in parallel with each other and transfer the signal of the pixel PX to the output terminals OS1, OS3, and OS5.

Thus, in the period of timings t71 to t72, the signal transfer from the output terminal OS1 to the input terminal IN11 through the line LN21_1 and the common line LN23, the signal transfer from the output terminal OS3 to the input terminal IN12 through the line LN24_1 and the common line LN26, and the signal transfer from the output terminal OS5 to the input terminal IN13 through the line LN27_1 and the common line LN29 are performed in parallel with each other.

Immediately before a timing t72, the active level timing control pulse φTM1 is supplied to the even-numbered pulse control circuits PL2, PL4, and PL6 in parallel with each other. The even-numbered pulse control circuits PL2, PL4, and PL6 activate the corresponding output circuits OC2, OC4, and OC6 in parallel with each other and transfer the signal of the pixel PX to the output terminals OS2, OS4, and OS6.

Thus, in the period of timings t72 to t73, the signal transfer from the output terminal OS2 to the input terminal IN11 through the line LN22_1 and the common line LN23, the signal transfer from the output terminal os4 to the input terminal IN12 through the line LN25_1 and the common line LN26, and the signal transfer from the output terminal OS6 to the input terminal IN13 through the line LN28_1 and the common line LN29 are performed in parallel with each other.

That is, the signal transfer from the odd-numbered output terminals to the input terminals IN11 to LN13 through the lines and the common lines in the period of timings t71 to t72 and the signal transfer from the even-numbered output terminals to the input terminals IN11 to IN13 through the lines and the common lines in the period of timings t72 to t73 are serially performed.

In the chip CH3_2, the timing generation circuit TG supplies the active level timing control pulse φTM1 to the odd-numbered pulse control circuits PL1, PL3, and PL5 in parallel immediately before each timing t73. The odd-numbered pulse control circuits PL1, PL3, and PL5 activate the corresponding output circuits OC1, OC3, and OC5 in parallel with each other and transfer the signal of the pixel PX to the output terminals OS1, OS3, and OS5.

Thus, in the period of timings t73 to t74, the signal transfer from the output terminal OS1 to the input terminal IN11 through the line LN21_2 and the common line LN23, the signal transfer from the output terminal OS3 to the input terminal IN12 through the line LN24_2 and the common line LN26, and the signal transfer from the output terminal OS5 to the input terminal IN13 through the line LN27_2 and the common line LN29 are performed in parallel with each other.

Immediately before a timing t74, the active level timing control pulse φTM1 is supplied to the even-numbered pulse control circuits PL2, PL4, and PL6 in parallel with each other. The even-numbered pulse control circuits PL2, PL4, and PL6 activate the corresponding output circuits OC2, OC4, and OC6 in parallel with each other and transfer the signal of the pixel PX to the output terminals OS2, OS4, and OS6.

Thus, in the period of timings t74 to t75, the signal transfer from the output terminal OS2 to the input terminal IN11 through the line LN22_2 and the common line LN23, the signal transfer from the output terminal OS4 to the input terminal IN12 through the line LN25_2 and the common line LN26, and the signal transfer from the output terminal OS6 to the input terminal IN13 through the line LN28_2 and the common line LN29 are performed in parallel with each other.

That is, the signal transfer from the odd-numbered output terminals to the input terminals IN11 to LN13 through the lines and the common lines in the period of timings t73 to t74 and the signal transfer from the even-numbered output terminals to the input terminals IN11 to IN13 through the lines and the common lines in the period of timings t74 to t75 are serially performed.

In the chip CH3_3, the timing generation circuit TG supplies the active level timing control pulse φTM1 to the odd-numbered pulse control circuits PL1, PL3, and PL5 in parallel immediately before each timing t75. The odd-numbered pulse control circuits PL1, PL3, and PL5 activate the corresponding output circuits OC1, OC3, and OC5 in parallel with each other and transfer the signal of the pixel PX to the output terminals OS1, OS3, and OS5.

Thus, in the period of timings t75 to t76, the signal transfer from the output terminal OS1 to the input terminal IN11 through the line LN21_3 and the common line LN23, the signal transfer from the output terminal OS3 to the input terminal IN12 through the line LN24_3 and the common line LN26, and the signal transfer from the output terminal OS5 to the input terminal IN13 through the line LN27_3 and the common line LN29 are performed in parallel with each other.

Immediately before a timing t76, the active level timing control pulse φTM1 is supplied to the even-numbered pulse control circuits PL2, PL4, and PL6 in parallel with each other. The even-numbered pulse control circuits PL2, PL4, and PL6 activate the corresponding output circuits OC2, OC4, and OC6 in parallel with each other and transfer the signal of the pixel PX to the output terminals OS2, OS4, and OS6.

Thus, in the period of timings t76 to t77, the signal transfer from the output terminal OS2 to the input terminal IN11 through the line LN22_3 and the common line LN23, the signal transfer from the output terminal OS4 to the input terminal IN12 through the line LN25_3 and the common line LN26, and the signal transfer from the output terminal OS6 to the input terminal IN13 through the line LN28_3 and the common line LN29 are performed in parallel with each other.

That is, the signal transfer from the odd-numbered output terminals to the input terminals IN11 to LN13 through the lines and the common lines in the period of timings t75 to t76 and the signal transfer from the even-numbered output terminals to the input terminals IN11 to IN13 through the lines and the common lines in the period of timings t76 to t77 are serially performed.

In the chip CH3_4, the timing generation circuit TG supplies the active level timing control pulse φTM1 to the odd-numbered pulse control circuits PL1, PL3, and PL5 in parallel immediately before each timing t77. The odd-numbered pulse control circuits PL1, PL3, and PL5 activate the corresponding output circuits OC1, OC3, and OC5 in parallel with each other and transfer the signal of the pixel PX to the output terminals OS1, OS3, and OS5.

Thus, in the period of timings t77 to t78, the signal transfer from the output terminal OS1 to the input terminal IN11 through the line LN21_4 and the common line LN23, the signal transfer from the output terminal OS3 to the input terminal IN12 through the line LN24_4 and the common line LN26, and the signal transfer from the output terminal OS5 to the input terminal IN13 through the line LN27_4 and the common line LN29 are performed in parallel with each other.

Immediately before a timing t78, the active level timing control pulse φTM1 is supplied to the even-numbered pulse control circuits PL2, PL4, and PL6 in parallel with each other. The even-numbered pulse control circuits PL2, PL4, and PL6 activate the corresponding output circuits OC2, OC4, and OC6 in parallel with each other and transfer the signal of the pixel PX to the output terminals OS2, OS4, and OS6.

Thus, in the period of timings t78 to t79, the signal transfer from the output terminal OS2 to the input terminal IN11 through the line LN22_4 and the common line LN23, the signal transfer from the output terminal OS4 to the input terminal IN12 through the line LN25_4 and the common line LN26, and the signal transfer from the output terminal OS6 to the input terminal IN13 through the line LN28_4 and the common line LN29 are performed in parallel with each other.

That is, the signal transfer from the odd-numbered output terminals to the input terminals IN11 to LN13 through the lines and the common lines in the period of timings t77 to t78 and the signal transfer from the even-numbered output terminals to the input terminals IN11 to IN13 through the lines and the common lines in the period of timings t78 to t79 are serially performed.

Here, the total length of the signal wire WL13 is shorter than that of the signal wire WL11 (see FIG. 11), and the signal wire WL13 can be manufactured at lower cost. In the analog front end AFE3, the number of input terminals IN11 to IN13 is smaller than that of the analog front end AFE1 (see FIG. 11), the circuit configuration between the input terminals IN11 to IN13 and the digital processing circuit DPC can be simplified, and a low-priced version analog front end can be used.

In this manner, each of chips CH3_1 to CH3_4 can transfer the signals of the plurality of unit blocks UB1 to UB6 to the analog front end AFE3 in a form in which both speed and cost are taken into consideration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising a chip, wherein
the chip includes
a pixel array in which a plurality of pixel groups each including two or more pixels is arrayed at least in a column direction,
a plurality of signal lines that corresponds to the plurality of pixel groups, each of the plurality of signal lines being connected to a corresponding pixel group,
a plurality of output circuits that corresponds to the plurality of signal lines, each of the plurality of output circuits being connected to a corresponding signal line, and
a plurality of output terminals that corresponds to the plurality of output circuits, each of the plurality of output terminals being connected to a corresponding output circuit.

2. The solid-state imaging device according to claim 1, wherein
the chip further includes a control circuit that is connected to each of the plurality of output circuits.

3. The solid-state imaging device according to claim 2, wherein
the control circuit controls the plurality of output circuits such that signals are serially output from the plurality of output circuits to the plurality of output terminals.

4. The solid-state imaging device according to claim 2, wherein
the control circuit controls the plurality of output circuits such that signals are output from the plurality of output circuits to the plurality of output terminals in parallel.

5. The solid-state imaging device according to claim 2, wherein
the plurality of output circuits is grouped into a plurality of output circuit groups each including two or more output circuits,
the plurality of output terminals is grouped into a plurality of output terminal groups each including two or more output terminals, and
the control circuit controls the plurality of output circuits such that signals are output from the plurality of output circuit groups to the plurality of output terminal groups in parallel, and signals are serially output from two or more output circuits in each of the plurality of output circuit groups to two or more output terminals in the output terminal groups.

6. The solid-state imaging device according to claim 2, wherein
the control circuit controls presence or absence of signal output to the plurality of output terminals for each of the plurality of output circuits.

7. The solid-state imaging device according to claim 1, wherein
the chip further includes a scanning circuit that scans the pixel array in a column direction, and
the scanning circuit includes a plurality of circuit blocks corresponding to the plurality of pixel groups.

8. The solid-state imaging device according to claim 1, further comprising:
an analog front end; and
a signal wire that connects the plurality of output terminals and the analog front end in parallel.

9. The solid-state imaging device according to claim 1, further comprising:
an analog front end; and
a signal wire that connects the plurality of output terminals and the analog front end serially.

10. The solid-state imaging device according to claim 1, wherein
the plurality of output terminals is grouped into a plurality of output terminal groups each including two or more output terminals, and
the solid-state imaging device further comprises:
an analog front end; and
a signal wire that connects the plurality of output terminal groups and the analog front end in parallel and connects the two or more output terminals and the analog front end serially.

11. The solid-state imaging device according to claim 1, further comprising:

an analog front end that is separated from the chip in a longitudinal direction of the chip; and a signal wire that connects the plurality of output terminals and the analog front end.

12. The solid-state imaging device according to claim 11, wherein the analog front end includes a first input terminal, a second input terminal, and a third input terminal, the plurality of output terminals includes a first output terminal, a second output terminal, and a third output terminal, and the signal wire includes a first line that connects the first output terminal and the first input terminal while forming an L shape, a second line that connects the second output terminal and the second input terminal while forming an L shape larger than the first line, and a third line that connects the third output terminal and the third input terminal while forming an L shape larger than the second line.

13. The solid-state imaging device according to claim 11, wherein the analog front end includes a first input terminal, the plurality of output terminals includes a first output terminal, a second output terminal, and a third output terminal, and the signal wire includes a first line that connects the first output terminal and the first input terminal while forming an L shape, a second line that connects the second output terminal and the first line, and a third line that connects the third output terminal and the first line.

14. The solid-state imaging device according to claim 11, wherein the analog front end includes a first input terminal and a second output terminal, the plurality of output terminals includes a first output terminal, a second output terminal, and a third output terminal, and the signal wire includes a first line that connects the first output terminal and the first input terminal while forming an L shape, a second line that connects the second output terminal and the first line, and a third line that connects the third output terminal and the second output terminal while forming an L shape larger than the first line.

15. The solid-state imaging device according to claim 1, comprising a plurality of the chips, the solid-state imaging device further comprising an analog front end to which the plurality of chips is connected.

16. The solid-state imaging device according to claim 15, further comprising a signal wire that connects the plurality of chips and the analog front end serially.

17. The solid-state imaging device according to claim 16, wherein the signal wire connects the plurality of output terminals of each of the plurality of chips and the analog front end serially.

18. The solid-state imaging device according to claim 16, wherein the signal wire connects the plurality of output terminals of each of the plurality of chips and the analog front end in parallel.

19. The solid-state imaging device according to claim 16, wherein in each of the plurality of chips, the plurality of output terminals is grouped into a plurality of output terminal groups each including two or more output terminals, and the signal wire connects the plurality of output terminal groups of each of the plurality of chips and the analog front end in parallel and connects the two or more output terminals and the analog front end serially.

20. The solid-state imaging device according to claim 15, wherein the plurality of chips is arranged in a longitudinal direction of the chip, and the analog front end is separated from the plurality of chips in the longitudinal direction.

* * * * *